United States Patent [19]

Reed

[11] Patent Number: 4,700,375
[45] Date of Patent: Oct. 13, 1987

[54] BATTERY CHARGING, RESET, AND DATA TRANSFER SYSTEM

[75] Inventor: John D. Reed, Arlington, Tex.

[73] Assignee: Motorola, Inc., Schaumburg, Ill.

[21] Appl. No.: 947,157

[22] Filed: Jan. 5, 1987

Related U.S. Application Data

[63] Continuation-in-part of Ser. No. 917,923, Oct. 10, 1986.

[51] Int. Cl.$^4$ .............................................. H04Q 7/04
[52] U.S. Cl. ........................................ 379/61; 379/62; 455/89
[58] Field of Search ................. 340/825.44; 455/89, 455/69, 127, 33, 56; 379/61, 62, 56, 58, 63

[56] References Cited

U.S. PATENT DOCUMENTS

| | | | |
|---|---|---|---|
| 4,467,140 | 8/1984 | Fathauer et al. | 179/2 EA |
| 4,511,761 | 4/1985 | Yamazaki et al. | 379/61 |
| 4,593,155 | 6/1987 | Hawkins | 379/62 |
| 4,634,810 | 1/1987 | Grassl et al. | 379/61 |
| 4,652,875 | 3/1987 | Waki | 340/825.44 |
| 4,654,481 | 3/1987 | Carris et al. | 379/62 |
| 4,656,653 | 4/1987 | Oda et al. | 379/61 |
| 4,673,861 | 6/1987 | Dubovsky | 320/2 |

Primary Examiner—Robert Lev
Attorney, Agent, or Firm—Steven G. Parmelee

[57] ABSTRACT

A vehicle mounted mobile transceiver (11) communicates via a secondary mobile unit (51) with a short range portable unit (10). The portable unit (10) can be either a cordless microphone or a transceiver. The portable unit (10) allows a remotely positioned operator to transmit messages to a base station (13). To ensure security and reliable operation, the portable and vehicle mounted units use digitized codes for ID and instruction purposes. These codes are newly generated from time to time by the vehicle mounted unit and are imparted to the portable unit via a battery charging interface by modulating the battery charging signal with the reset and digital data signals. An improved remote squelch detect is also provided.

8 Claims, 24 Drawing Figures

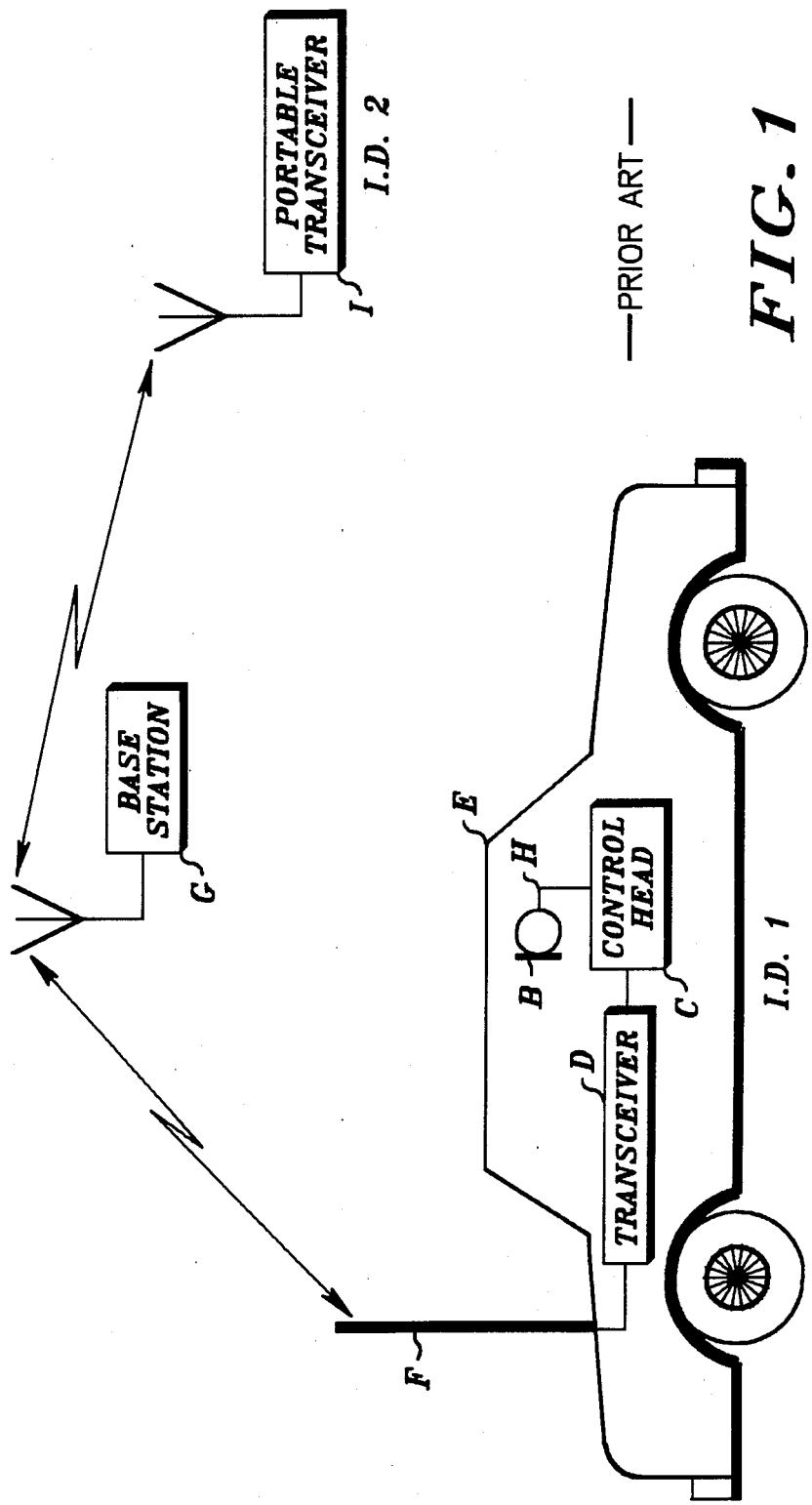

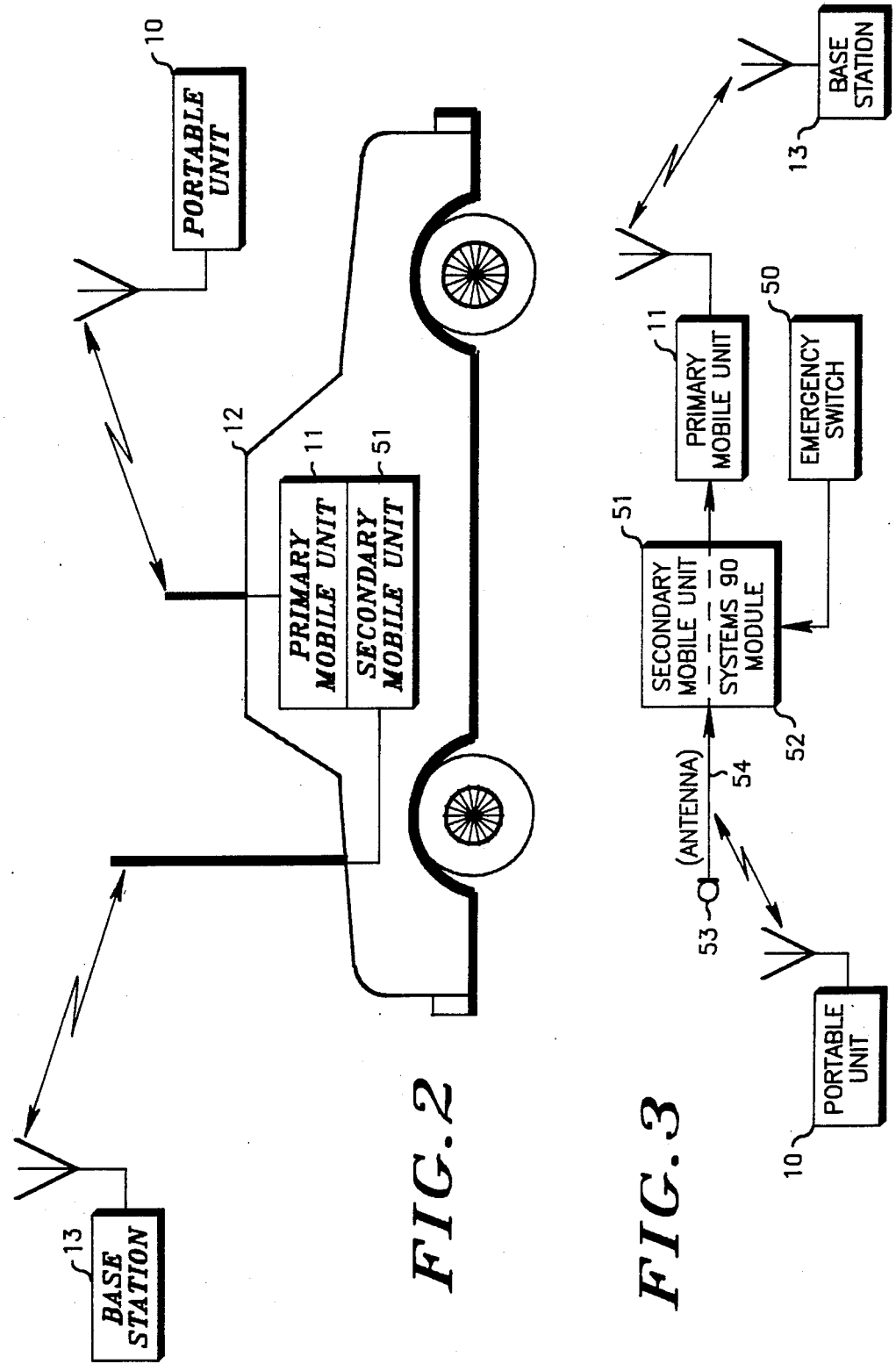

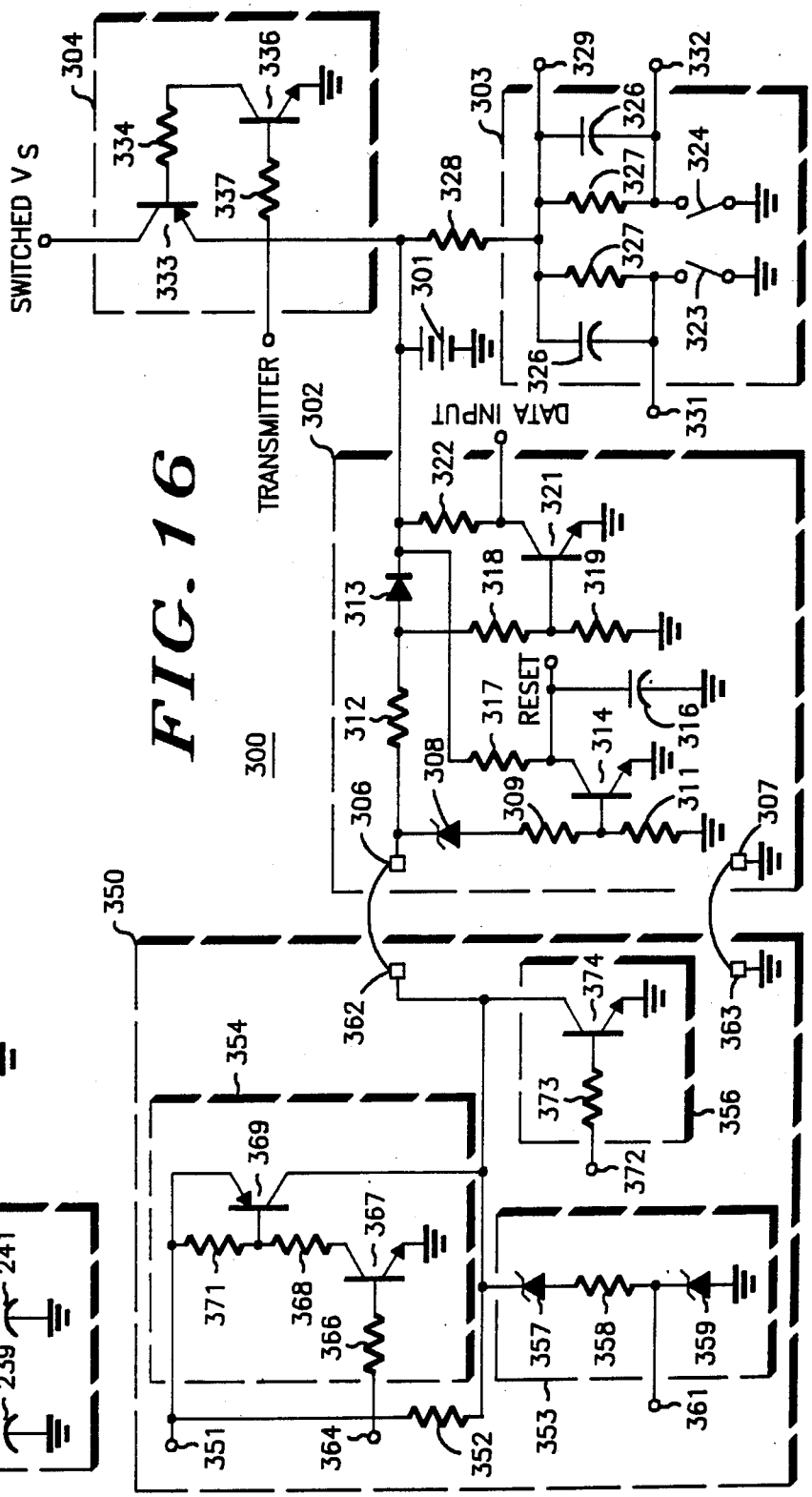

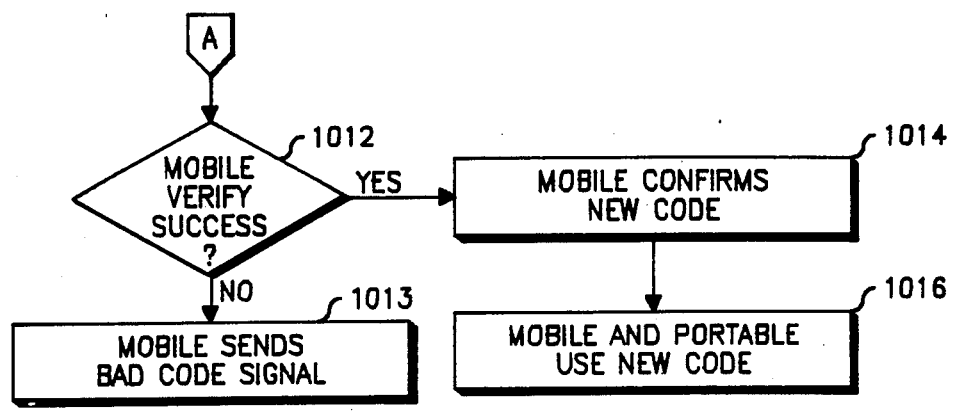
FIG. 17B
FIG. 18
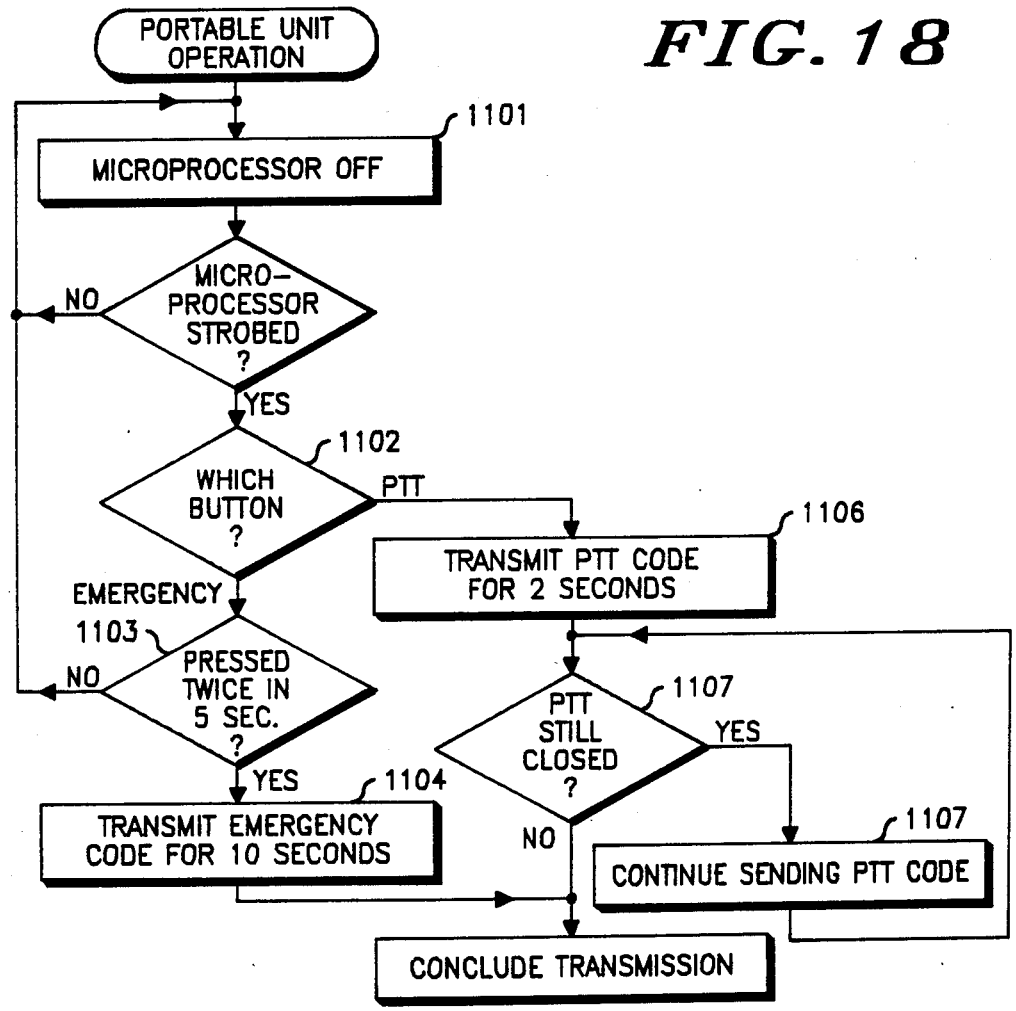

BATTERY CHARGING, RESET, AND DATA TRANSFER SYSTEM

This is a continuation-in-part of application Ser. No. 917,923, filed Oct. 10, 1986.

TECHNICAL FIELD

This invention relates generally to RF communications systems, and particularly to mobile radio systems. The invention also relates to portable radios that may be used with such a mobile radio system.

BACKGROUND ART

RF communications systems are well known in the art. In many such systems, as in public safety applications, vehicles are equipped with mobile transceivers that allow public safety officers to communicate with one or more base stations and also with other similarly equipped vehicles in the system. With reference to FIG. 1, such a mobile based system typically includes a vehicle (E) mounted transceiver (A), microphone (B), control head (C), and antenna (F). In addition, a base station (G) communicates with the vehicle mounted equipment and typically serves as a message dispatch center. As the situation may require, repeaters (not shown) may be provided to extend the effective range between the mobile and base station, all as well understood in the art.

The above configuration works well, so long as the public safety officer (or other individual) remains in the vehicle (E). Once the officer moves beyond the operational range of the microphone (B), however, the officer typically loses the ability to forward communications to the base station (G). Since the range of the microphone (B) will usually be governed by the length of the microphone cord (H), and since this cord (H) must usually be relatively short, communications remote from the vehicle (E) are usually rendered difficult if not impossible.

To meet this problem, portable transceivers (I) can be used to allow the officer to be able to communicate with the base station (G) when separated from the vehicle (E). The portable transceiver (I) must, in order to be effective, emulate the vehicle mounted system in all relevant aspects, including frequency capabilities, power rating, and signalling capabilities. In effect, a public safety service that implements this system must provide two wholly and independently functioning radio systems for each of its vehicles. Though this adequately supports the desired communication function, this solution also represents a relatively costly approach.

There therefore exists a need to provide relatively inexpensive, effective, and reliable communications for public safety officers and others who ordinarily make use of a vehicle mounted transceiver but who must also carry out operations away from the vehicle from time to time.

SUMMARY OF THE INVENTION

These needs and others are substantially met through provision of the improved mobile radio communications system disclosed herein. This system makes use of a relatively short range portable transmitter (or transceiver, as the case may be) that directly communicates with a secondary mobile unit. The secondary mobile unit in turn communicates with the primary vehicle mounted mobile transceiver. The secondary mobile unit functions to ensure the propriety of communicating with the portable unit, and then acts in concert with the primary mobile unit like a repeater to allow communication between the portable and the base station.

The short range needs of the portable unit minimize power requirements, and in part allow the portable unit to be manufactured and operated in a relatively inexpensive manner. In a transmit only configuration, the portable unit essentially operates as a cordless microphone. If desired, a public address system can be provided on the vehicle to allow return messages to be audibly broadcast to the portable user. In a transceiver configuration, of course, return messages could be returned directly to the portable unit via a two-way link with the secondary mobile unit.

The portable unit includes a battery to support its portable function. To reduce maintenance and enhance reliability, the battery can be regularly recharged. The secondary mobile unit can have a battery charging circuit that functions to recharge the portable unit battery whenever the portable unit is connected thereto.

To ensure that the secondary mobile unit and the portable unit recognize the legitimacy of each other's communications, subaudible digital codes are transmitted therebetween as necessary. To minimize maintenance, these codes are freshly generated and exchanged each time the portable unit and the secondary mobile unit are physically joined. In one embodiment, these codes are generated by the secondary mobile unit and transmitted to the portable unit via the battery charger circuit. In another embodiment, the battery charger circuit can be controlled to allow a microprocessor in the secondary mobile unit to reset a microprocessor on board the portable unit. When both the portable unit and the secondary mobile unit are transceivers, the possibility exists that the portable unit may move out of range of the secondary mobile unit, and that an incoming message may be missed or that an outgoing message may be prevented. To resolve this, in one embodiment the secondary mobile unit occassionally broadcasts a range burst signal. If the portable unit does not receive such a range burst signal with a predetermined period of time, an out of range alarm can be provided by the portable unit to the user.

In another embodiment, the portable unit can be configured to provide an acknowledge signal upon receiving a message from the secondary mobile unit. If the secondary mobile unit does not receive such an acknowledgement, it will broadcast a missed message signal. When the portable unit moves back within range, it will receive the missed message signal and provide a missed message alert to the user. The user can then take appropriate action to ascertain the contents of the message.

BRIEF DESCRIPTION OF THE DRAWINGS

These and other attributes of the invention will become more clear upon making a thorough and complete study and review of the following description of the best mode for carrying out the invention, particularly when reviewed in conjunction with the drawings, wherein:

FIG. 1 comprises a block diagram depiction of the prior art;

FIG. 2 comprises a block diagram depiction of the invention;

FIG. 3 comprises a block diagram depiction of the invention;

FIGS. 10A-C comprise a schematic diagram of the transmitter;

FIG. 16 comprises a schematic diagram of the battery charging and interface circuit;

FIG. 18 comprises a flow chart of portable unit operation under certain operating circumstances;

BEST MODE FOR CARRYING OUT THE INVENTION

Figure 4:
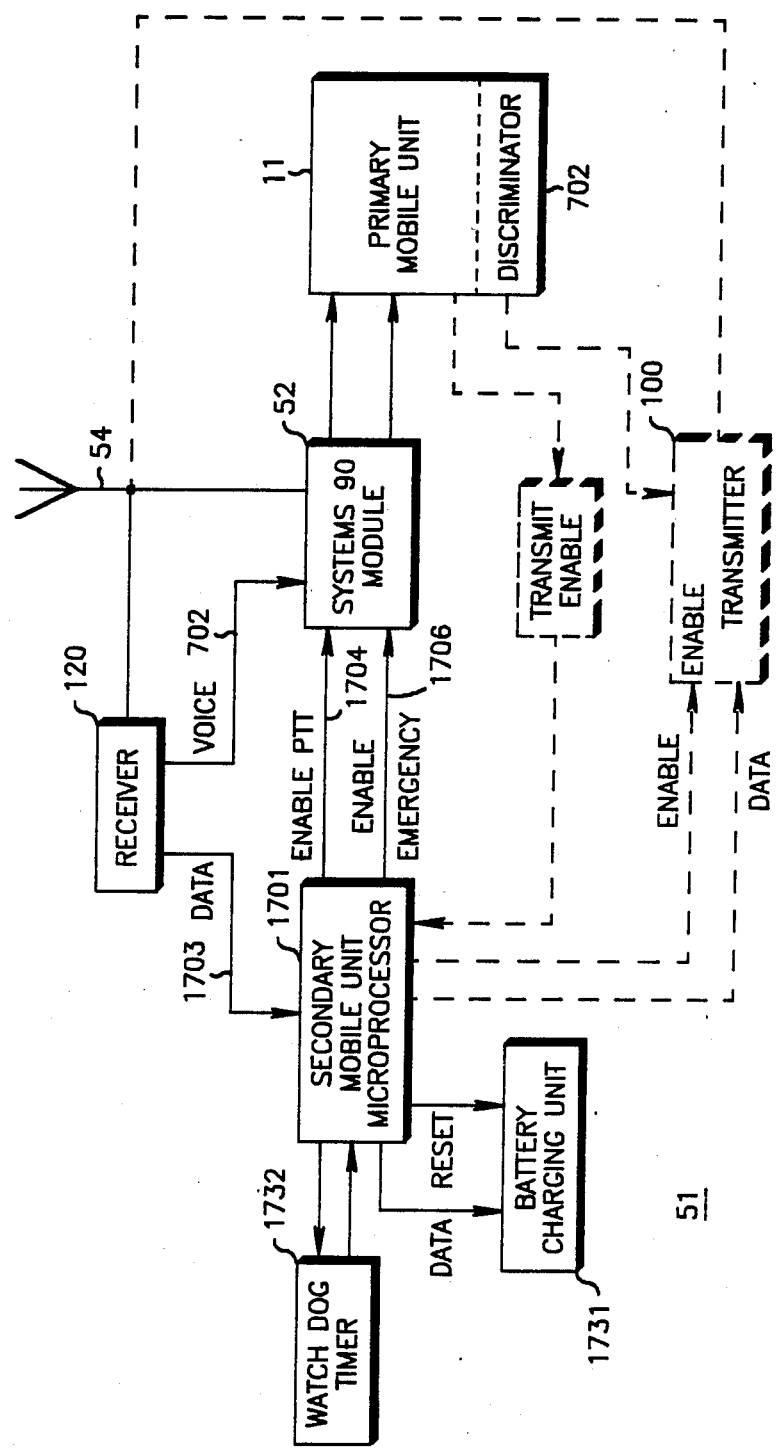
FIG. 4 comprises a block diagram depiction of the interface between the secondary mobile unit and the vehicle's communication system.

Referring now to the drawings, and in particular to FIG. 2, the invention can be seen to comprise a portable unit transmitter (10) (or transceiver, as the case may be, and as explained in more detail below) that communicates with a secondary mobile unit (51) that mounts in a vehicle (12). The secondary mobile unit (51) connects to a primary mobile unit (11) that in turn communicates with a base station (13). In effect, the primary and secondary mobile units (11 and 51) function as a repeater to connect the portable unit (10) to the base station (13).

In an application where the portable unit (10) includes only a transmitter and effectively comprises a cordless microphone, the portable unit (10) must meet certain FCC requirements governing operation of such a device in the United States. For example, the portable unit (10) can only transmit on one of eight frequencies (169.445 MHz, 169.505 MHz, 170.245 MHz, 170.305 MHZ, 171.045 MHZ, 171.105 MHz, 171.845 MHz, or 171.905 MHz). The maximum output power cannot exceed 50 milliwatts, and the maximum emission bandwidth cannot exceed 54 kHz. It should be noted that these particular frequencies may give rise to data reception problems, since adjacent frequencies can be used for hydrological and meteorological data transmissions as used by the power, petroleum, forest products, business, and railroad radio services. Therefore, care must be taken to ensure that the portable unit (10) will not only meet the above noted specifications, but that the system will also remain relatively immune to interference problems from adjacent channels.

Referring now to FIG. 3, the secondary mobile unit (51) that interfaces between the portable unit (10) and the primary mobile unit (11) essentially comprises a radio receiver (or transceiver when used with a portable transceiver as explained below in more detail). In practice, the secondary mobile unit (51) can be mounted, for example, inside the housing of another radio interface product such as a Systems 90 module (52)(model number HLN106) as manufactured by Motorola, Inc. The Systems 90 module (52) connects between the primary mobile unit microphone (53) and the primary mobile unit (11) via the microphone input port.

The Systems 90 module (52) adds two primary features to a mobile system. First, the Systems 90 module (52) causes the primary mobile unit (11) to broadcast a subaudible digital signal comprising a unique ID code every time the operator closes the push-to-talk (PTT) switch on the microphone (53). In this way, a base station (13) equipped to decode the ID code can identify the mobile it is communicating with, and maintain a record of such proceedings. Second, the Systems 90 module (52) can detect switching of an emergency switch (50). When switching is sensed, the Systems 90 module (52) will cause the ID code for the mobile, plus an emergency code, to be broadcast to the base station (13) for at least a predetermined period of time, or until the base station (13) acknowledges receipt of the signal. In this way, an operator can press the emergency switch (50), and the primary mobile unit (11) will broadcast this call for help to the base station (13) regardless of what else the operator may do. As will be shown below, the secondary mobile unit (51) can interface with such a module (52) and thereby allow the portable unit (10) to have benefit of such features as well.

Referring now to FIG. 4, the secondary mobile unit can be seen as generally depicted by the numeral 51 and as configured in conjunction with a Systems 90 module (52). The secondary mobile unit (51) includes generally an antenna (54) (which may be comprised of the microphone cord (54) for the primary mobile unit (11)), a receiver (120), a secondary mobile unit microprocessor (1701), a battery charging unit (1731), and a watchdog timer (1732).

As will be described below in more detail, the receiver (120) receives both voice and data signals from the portable unit (10) and then functions to separate these signals to thereby provide the voice signal (702) directly to the Systems 90 module (52) where it can serve as the audio input to the primary mobile unit (11). The data signals (1703) from the portable unit (10) are provided to the secondary mobile unit microprocessor (1701) (provided, for example, through use of an MC146805F2 as manufactured by Motorola, Inc.).

The microprocessor (1701) functions to decode and act upon the incoming data signals and will function either to enable a PTT switch in the Systems 90 module (52) by providing an enable PTT signal (1704) or to enable transmission of an emergency signal via the Systems 90 module (52) through provision of an enable emergency signal (1706). The microprocessor (1701) can also provide encoded data and reset signals as described below to the battery charging unit (1731) for use in providing new communication codes to the portable unit (10).

Finally, the watchdog timer (1732) may be utilized to assure regular proper operation of the microprocessor (1701) in accordance with well understood prior art technique.

Figure 5:
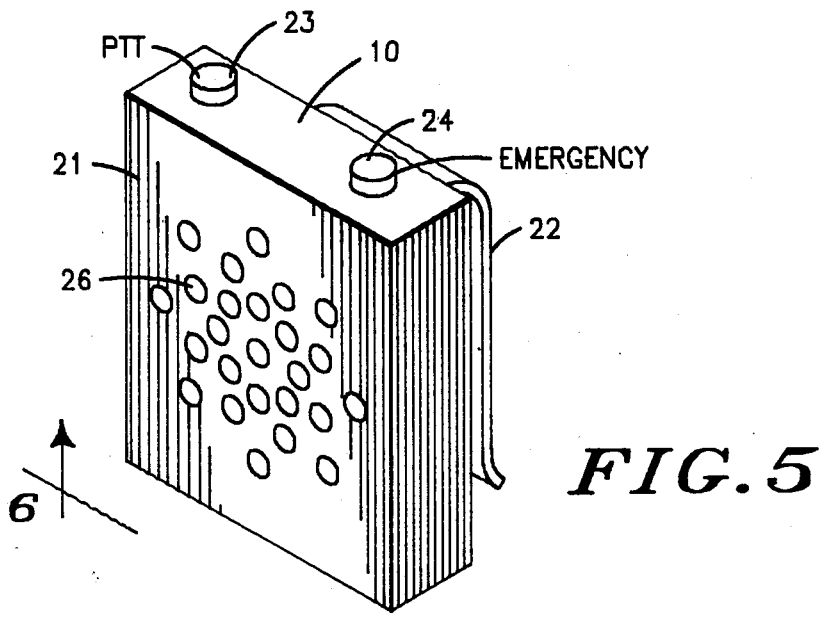
FIG. 5 comprises a perspective view of the portable unit.

Referring now to FIG. 5, the portable unit (10) can be housed in a small plastic housing (21) having a belt clip (22) to allow easy mounting of the portable unit (10) on the person of the operator. The portable unit (10) also includes a PTT button (23), an emergency button (24), and a microphone (26). A loop antenna, such as those used in personal pagers, can be concealed on the inside of the housing (21).

Figure 6:
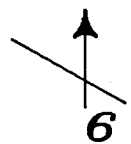
FIG. 6 comprises a bottom plan view of the portable unit.
Figure 7:
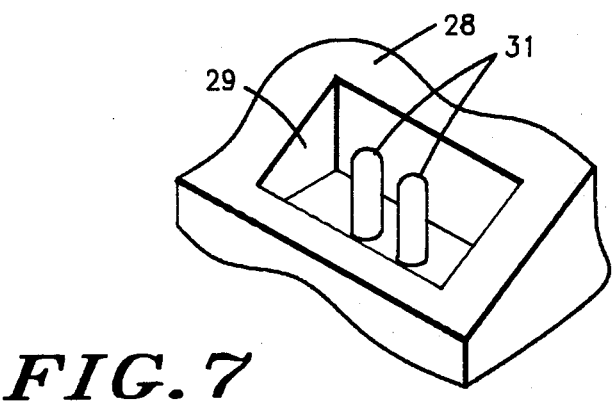
FIG. 7 comprises a detailed perspective view of the battery charging hub.

In addition, and with reference to FIG. 6, two battery charging ports (27) can be provided through the housing (21) to allow access to a battery (and other circuitry described below). To complement the charging ports (27), a battery charging HUB (28) (FIG. 7) can be provided having a cavity (29) formed therein for receiving the portable unit (10) and having appropriate conductors (31) disposed therein that mate with the charging ports (27) of the portable unit (10). The battery charging HUB (28) can be operably configured in conjunction with the secondary mobile unit (51) as described below in more detail.

Figure 8:
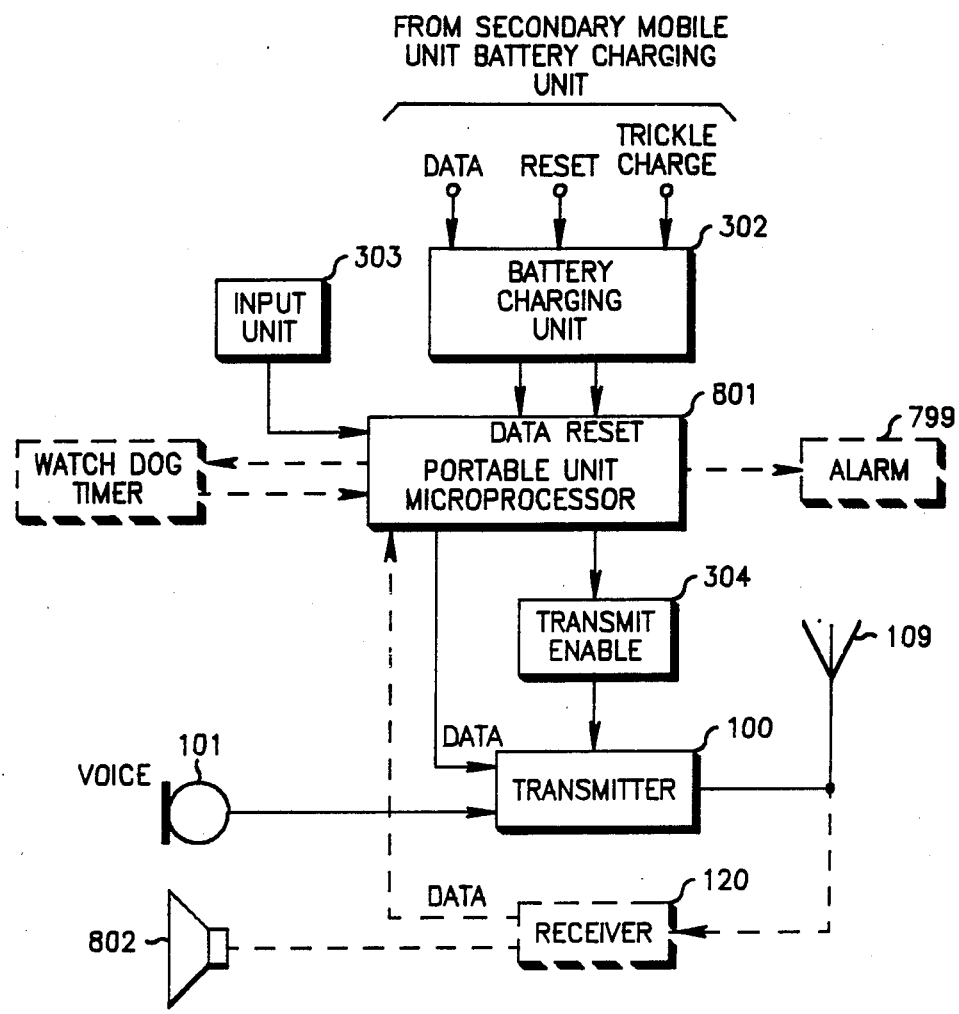
FIG. 8 comprises a block diagram depiction of the portable unit.

Referring now to FIG. 8, the portable unit can be seen as depicted generally by the numeral 10. The portable unit (10) includes generally a portable unit microprocessor (801), an input unit (303), a battery charging unit (302), a transmit enable unit (304), a transmitter (100), a microphone (101), and an antenna (109).

The portable unit microprocessor (801) receives input signals from the input unit (303) as operated by the operator. The input unit (303) comprises the PTT button (23) and the emergency button (24) referred to above. The microprocessor (801) responds to these switches by causing the transmit enable unit (304) to enable the transmitter (100). In the ordinary operating mode, the microprocessor can literally be turned off in order to minimize current drain and extend battery life. When the operator pushes either button, related circuitry activates the microprocessor and strobes an interrupt to cause the microprocessor to determine which button was pushed and to react accordingly. If the PTT button has been pushed, an appropriate PTT code is tranmitted subaudibly by the portable to the mobile for a predetermined period of time, such as two seconds. This allows the mobile to identify the portable (this normally requires around 642 milliseconds), and for the base station to decode ånd acknowledge the mobile. If the PTT button remained closed beyond the two seconds, the portable continues to send the PTT code. Otherwise, a termination of message signal may be sent. The battery charging unit (302) allows a battery (not shown) to be charged when the portable unit (10) is in the battery charging hub (28) described above. The battery charging unit (302) also allows the portable unit microprocessor (801) to be reset by the secondary mobile unit (51) and to allow the secondary mobile unit (51) to transmit data to the portable unit microprocessor (801), as described below in more detail.

In an alternative embodiment, the portable unit (10) can be configured as a transceiver having a receiver (120) that receives signals transmitted by the secondary mobile unit (51) and that demodulates these received signals to provide data to the portable unit microprocessor (801) and voice signals to an appropriate audio transducer system (802).

In another embodiment, the portable unit (10) can include additional buttons in the input unit (303) as desired to facilitate remote control of other desired functions, such as a public address system on board the vehicle, flashing lights on the vehicle, sirens on the vehicle, and the like.

Figure 9:
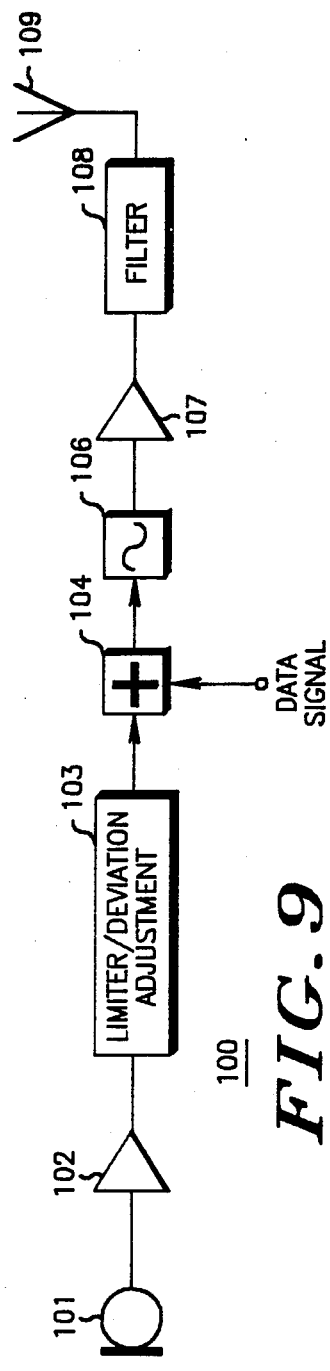
FIG. 9 comprises a block diagram depiction of a transmitter suitable for use in the invention.

Referring now to FIG. 9, a block diagram depiction of a transmitter suitable for use in the portable unit (10) (or in the secondary mobile unit (51) when the latter is configured as a transceiver) can be seen as generally depicted by the numeral 100. The transmitter (100) includes generally a microphone (101), a first amplifier (102), a limiter/deviation adjustment unit (103), a summation node (104), a frequency modulatable oscillator (106), a second amplifier (107), a filter (108), and an antenna (109). The first amplifier (102) serves to amplify audio signals provided by the microphone (101), which amplified signals are then passed to the limiter/deviation adjustment unit (103) to properly prepare the audio signal for modulation and subsequent transmission. The processed audio signal is then summed with data signals from the relevant microprocessor at the summation node (104) and utilized to modulate the oscillator (106). The modulated carrier signal then passes through the second amplifier (107) and output filter (108) to the antenna (109) that broadcasts the signal.

Figure 10A:
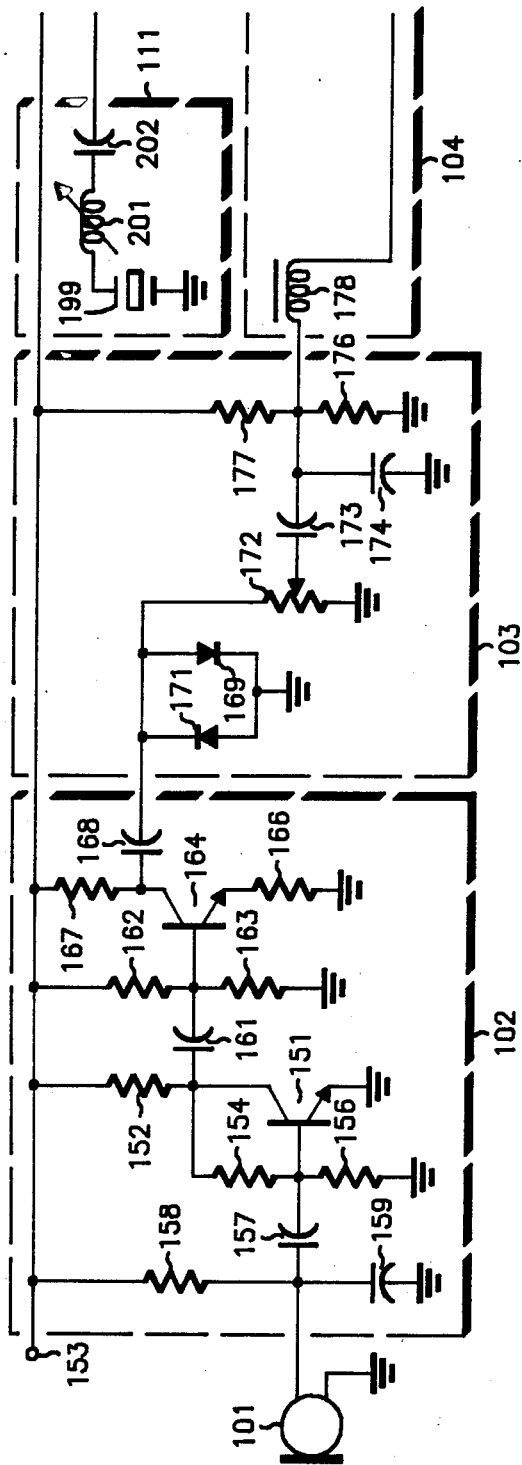
Figure 10B:
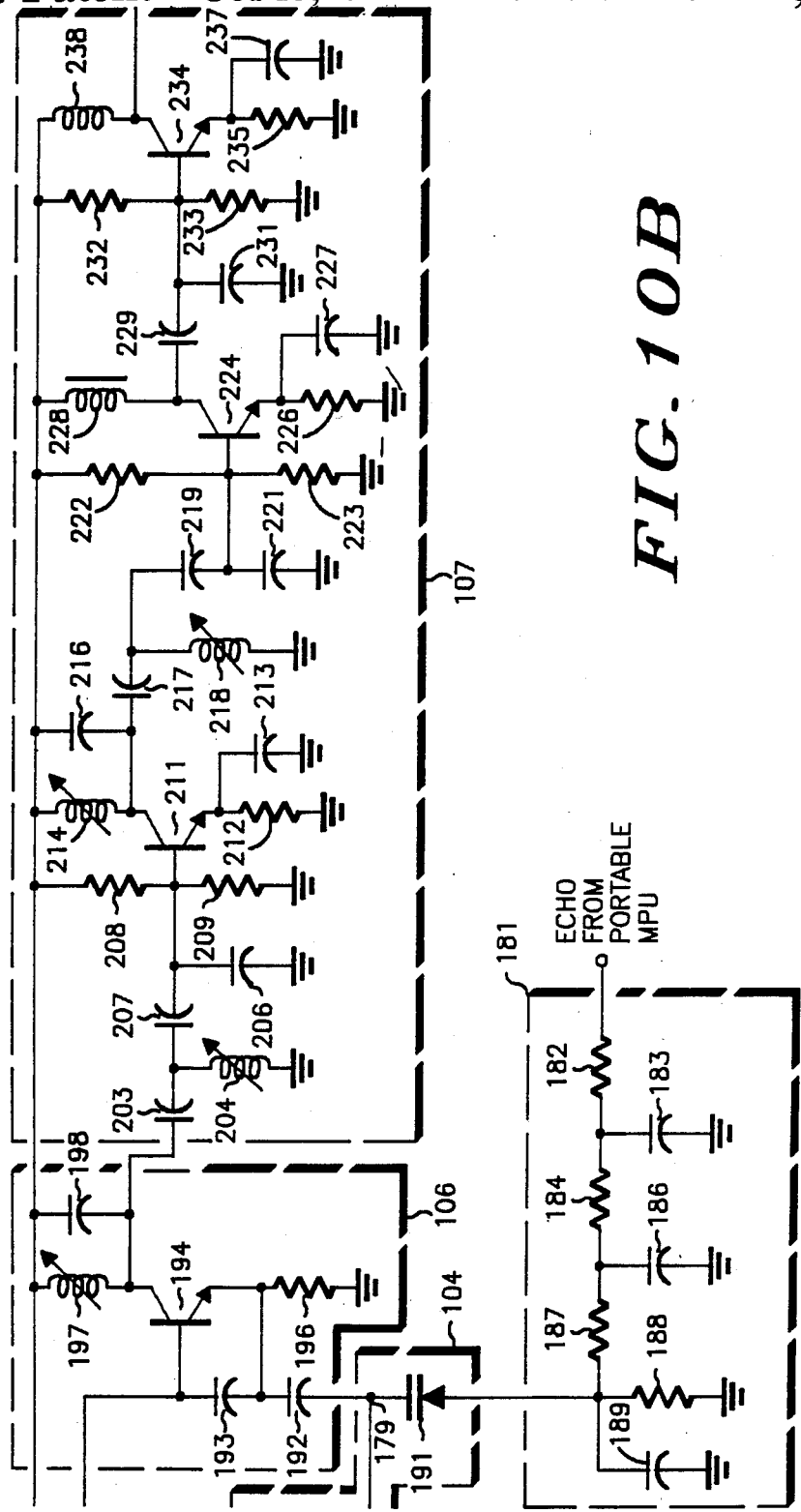

Referring now to FIGS. 10A-10C, a more detailed description of the transmitter (100) will be described.

The microphone (101) can be provided through use of a crystal microphone such as an MK 1301 (when using the transmitter (100) with the secondary mobile unit (51), one would of course substitute an appropriate audio signal coupling mechanism to allow input of the primary mobile unit (11) audio signal output). The output of the microphone (101) connects to an amplifier stage (102), essentially comprised of a buffer section and an amplification section. The buffer section includes a 9642 transistor (151) having its emitter connected to ground and its collector connected through a 5.1 k ohm resistor (152) to a switched voltage source (153) and also through a 100 k ohm resistor (154) to the base thereof. The base of this transistor (151) also connects to ground through a 100 k ohm resistor (156), and through a 0.02 microfarad capacitor (157) to the output of the microphone (101). In addition, the output of the microphone (101), connects to a 2.2 k ohm biasing resistor (158) and an appropriate grounded filter capacitor (159).

The collector of the transistor (151) connects through a 2 microfarad coupling capacitor (161) to a voltage divider comprised of a 47 k ohm resistor (162) and an 11 k ohm resistor (163), and also to the base of a 9648 transistor (164). The emitter of this transistor (164) connects to a 91 ohm resistor (166). The collector of this transistor (164) connects to a 3.3 k ohm biasing resistor (167), and through a 0.1 microfarad coupling capacitor (168) to the limiter/deviation adjustment stage (103).

The limiter/deviation adjustment stage (103) includes two grounded parallel configured back-to-back diodes (169 and 171) that provide the limiting function and an adjustable 50 k ohm resistor (172) that, in combination with a 0.1 microfarad capacitor (173), a 0.005 microfarad capacitor (174), and an appropriate voltage divider comprised of two resistors (176 and 177), provides the voice deviation adjustment function. The output of this stage (103) connects through an appropriate RF choke (178) to a summation node (179)(FIG. 10B).

The summation node (179) connects to a data signal unit (181) that comprises a plurality of capacitors and resistors configured to receive and shape data signals from the relevant microprocessor (either the portable unit microprocessor (801) or the secondary mobile unit microprocessor (701), as the case may be). In particular, the output from the microprocessor passes through a 20 k ohm resistor (182) to a grounded 0.05 microfarad capacitor (183). Next, the signal traverses a 36 k ohm resistor (184) and a 0.02 microfarad capacitor (186). Finally, after passing through a 51 k ohm resistor (187), the signal reaches a parallel grounded 7.8 k ohm resistor (188) and 500 picofarad capacitor (189) to then pass through a varactor (191) to reach the summation node (179).

The summation node (179) also connects through two series connected capacitors (192 and 193) to the base of an M9932 transistor (194) that comprises a part of the oscillator (106). The oscillator (106) further includes a resistor (196) that attaches to the emitter of the transistor (194) and an adjustable inductor (197) and parallel connected 57 picofarad capacitor (198) that connect between the collector of the transistor (194) and the switched power supply (153). In addition, the base of the transistor (194) connects to a frequency determining network (111) which comprises a series connected crystal (199), a variable inductor (201), and a 36 picofarad capacitor (202) that are connected between ground and the base of the transistor (194).

The collector of the transistor (194) comprises the output of the oscillator (106) and connects through a 2 picofarad coupling capacitor (203) to the amplification stage (107). The amplification stage (107) includes a grounded variable inductor (204) and a 120 picofarad capacitor (206) coupled by a 91 picofarad capacitor (207). A voltage divider comprised of a 68 k ohm resistor (208) and a grounded 120 ohm resistor (209) connects to the base of an M9494 transistor (211), the emitter of which connects to a parallel grounded 27 k ohm resistor (212) and a 390 picofarad capacitor (213).

The collector of this transistor (211) connects to a parallel configured variable inductor (214) and 9 picofarad capacitor (216), and also connects through a 2 picofarad coupling capacitor (217) to a grounded variable inductor (218) and a serially connected 13 picofarad capacitor (219) and 70 picofarad capacitor (221). The common node between the latter two capacitors (219 and 221) connects to a voltage divider comprised of a 6.8 k ohm resistor (222) and a 6.2 k ohm resistor (223), and also to the base of an M9494 transistor (224), the emitter of which connects to a parallel grounded 100 ohm resistor (226) and 390 picofarad capacitor (227).

The collector of this transistor (224) connects to an inductor (228) and through a 16 picofarad coupling capacitor (229) to a grounded 17 picofarad capacitor (231) and also to a voltage divider comprised of a 6.8 k ohm resistor (232) and a 6.2 k ohm resistor (233). The common node between these resistors (232 and 233) connects to the base of a third M9494 transistor (234), the emitter of which connects to a parallel grounded 510 ohm resistor (235) and 470 picofarad capacitor (237).

The collector of this transistor (234) connects to an inductor (238) and also to a filter stage (108)(FIG. 10C). The filter stage (108) includes two grounded capacitors (239 and 241) that are joined by an inductor (242) and through a coupling 22 picofarad capacitor (243) to an appropriate antenna (109).

In a system where the secondary mobile unit (51) and the portable unit (10) both comprise complete transceivers, some means must be provided for allowing the secondary mobile unit transmitter to have its transmit mode enabled. A voice responsive mechanism could be utilized to enable the secondary mobile unit transmitter whenever the output of the primary mobile unit (11) indicates the presence of an audible signal. These mechanisms, however, are typically slow to respond and often result in lost information. Another approach would be to directly access the squelch detect of the primary mobile unit (11) and connect appropriate wires to it to allow the squelch detect of the primary mobile unit (11) to control the transmit enable function of the secondary mobile unit transmitter. Although this would accomplish the necessary function, this approach represents substantial cost from the standpoint of retrofitting such a system into an existing mobile radio installation.

Figure 11:
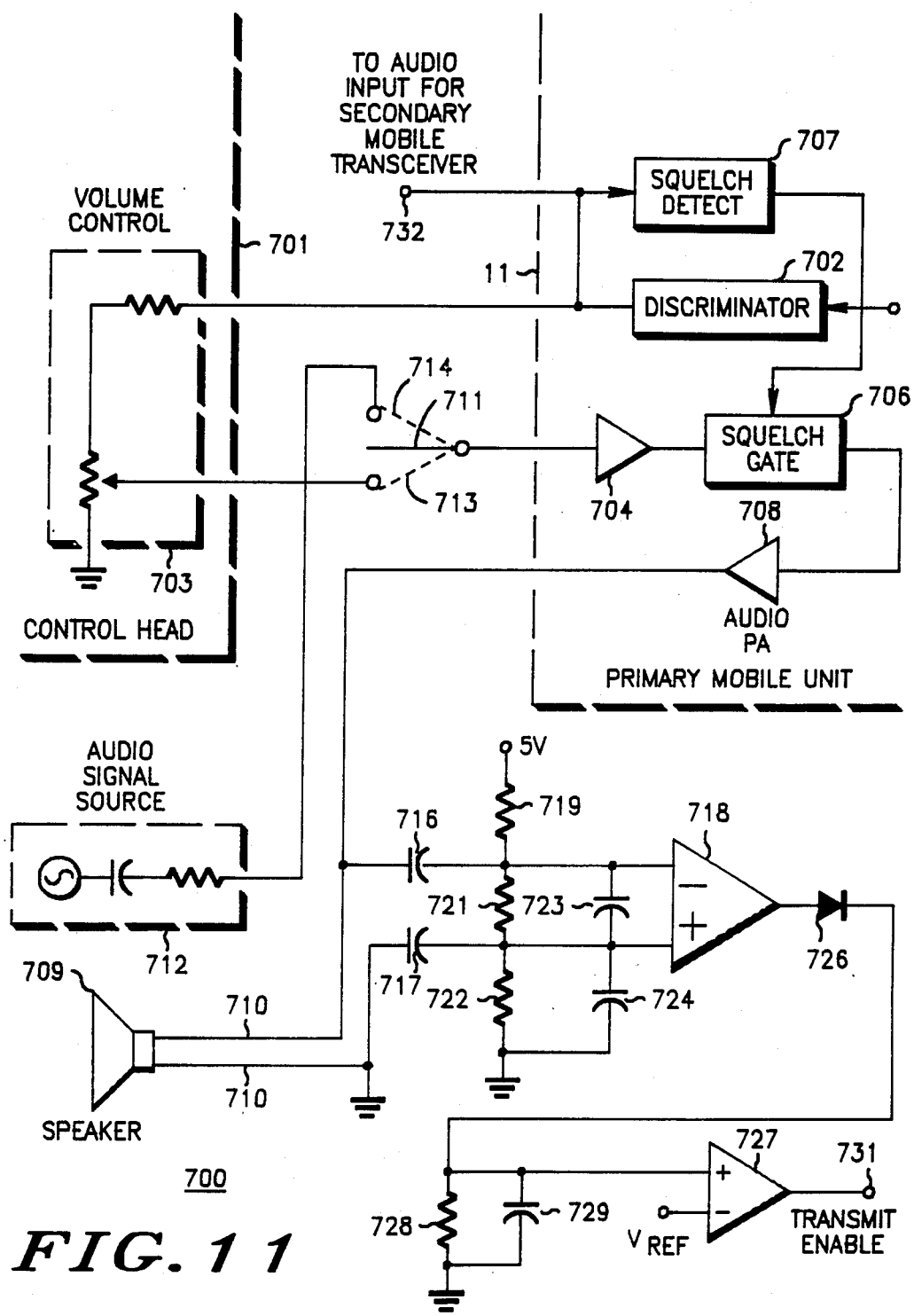
FIG. 11 comprises a schematic depiction of the transmit enable feature of the invention.

In one embodiment of this invention, a transmit enable signal for the secondary mobile unit transmitter can be provided through appropriate monitoring of the primary mobile unit's squelch gate status without requiring invasive rewiring of the primary mobile unit (11) itself. Referring to FIG. 11, an embodiment depicting such a squelch gate detector can be seen as referred to generally by the numeral 700. This squelch gate detector (700) functions in conjunction with the primary mobile unit (11) and the control head (701) associated therewith.

The primary mobile unit (11) will typically include a discriminator (702) for receiving a carrier signal as provided thereto and for extracting the information modulated thereon. The discriminator (702) output signal then ordinarily passes through a volume control switch (703) provided in the control head (701) before returning to the primary mobile unit (11) where it usually passes through one or more amplification and/or filter stages (704) before reaching a squelch gate (706). The squelch gate (706) responds to a squelch detect (707), which in turn monitors the output of the discriminator (702) to determine the presence of a viable signal in accordance with well understood prior art technique. In the absence of a viable signal, the squelch detect (707) will cause the squelch gate (706) to prevent the output of the amplifier stage (704) from reaching the audio power amplifier (708). In the presence of a viable signal, however, the squelch detect (707) will allow the squelch gate (706) to pass the signal to the audio power amplifier (708), which in turn amplifies the signal and renders it audible at the speaker (709).

Pursuant to this embodiment, a switch (711) can be added to allow the input to the amplifier (704) and squelch gate (706) to be switched between the discriminator (702) output and a predetermined audio signal source (712). When switched to a first position (indicated in phantom lines by the reference numeral 713), the output of the discriminator (702) will pass through the volume control (703), through the switch (711), and through the amplifier and squelch gate (704 and 706) as described above. When switched to a second position (as indicated in phantom lines by the numeral 714), however, the output of the audio signal source (712) will instead be provided to the amplifier and squelch gate (704 and 706).

When switched to the latter position (714), the operation of the squelch gate (706) will continue to remain a function of the output of the discriminator (702) as monitored by the squelch detect (707). Therefore, the squelch gate (706) will allow the audio signal source signal to pass through to the audio power amplifier (708) and the speaker (709) when the discriminator (702) provides an output indicating the presence of viable signal. In the alternative, the squelch gate (706) will prevent this predetermined audio signal from reaching the audio power amplifier (708) when the discriminator (702) does not output a viable signal as detected by the squelch detect (707).

The speaker terminals (710) can be monitored to determine the presence or absence of the audio signal. In particular, each terminal can be connected through a 0.1 microfarad capacitor (716 and 717) to the inputs of a first operational amplifier (718). In addition, the inverting input of the operational amplifier (718) can be connected to a 330 k ohm resistor (719) that connects to a positive 5 volt source, and to the noninverting input thereof through a 10 k ohm resistor (721). The noninverting input of the operational amplifier (718) can also be connected to a grounded 150 k ohm resistor (722). Finally, a 0.001 microfarad capacitor (723) can be connected between the two inputs to the operational amplifier (718), and a second 0.001 microfarad capacitor (724) can be connected between the noninverting input and ground.

The output of this operational amplifier (718) connects through a diode (726) to the noninverting input of a second operational amplifier (727), which input also connects to a grounded parallel configured 82 k ohm resistor (728) and 0.15 microfarad capacitor (729). The inverting input of this second operational amplifier (727) connects to a reference voltage ($V_{REF}$) having a value, for instance, of 1.8 volts.

So configured, the output (731) of the second operational amplifier (727) comprises a transmit enable port that can be utilized by the secondary mobile unit transmitter to enable transmission of the audio signal then being provided at an appropriate port (732) at the output of the discriminator.

Through provision of the above described embodiment, easily available connections to the existing radio equipment can be made while simultaneously assuring reliable and effective squelch detect and transmission enabling.

Figure 12:
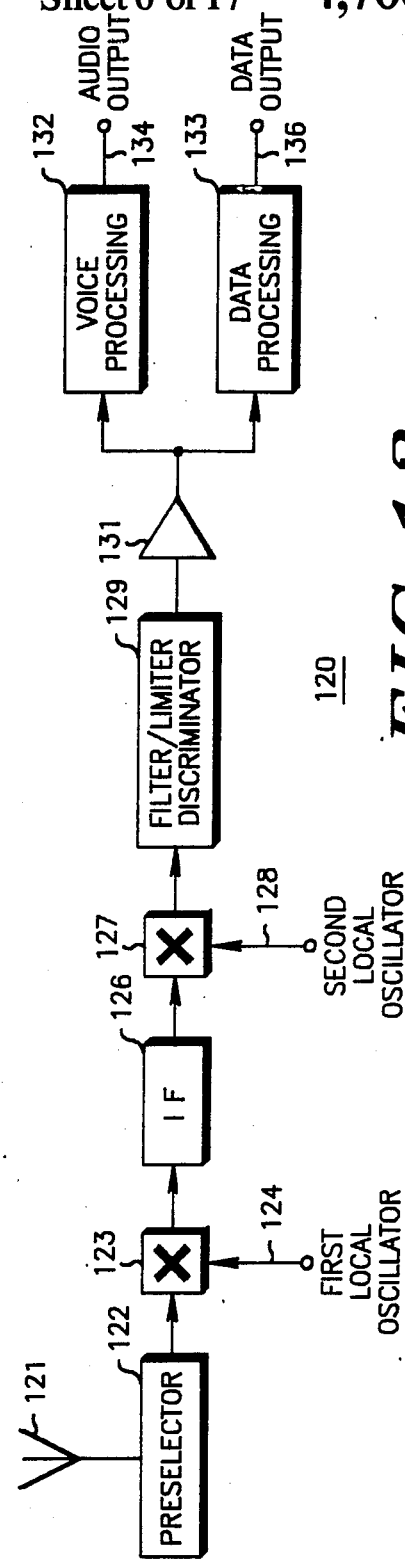
FIG. 12 comprises a block diagram depiction of a receiver suitable for use in the invention.

Referring now to FIG. 12, a block diagram depiction of a receiver suitable for use in the secondary mobile unit (51)(or in a transceiver configured portable unit (10)) can be seen as generally depicted by the numeral 120. The receiver (120) includes generally an antenna (121), a preselector (122), a first mixer (123) for mixing the output of the preselector (122) with the output of a first local oscillator (124), an IF section (126), a second mixer (127) for mixing the output of the IF section (126) with the output of a second local oscillator (128), a filter/limiter/discriminator (129) for extracting the information signal contained in the incoming signal, an amplifier output stage (131), a voice processing channel (132), and a data processing channel (133).

In the secondary mobile unit (51) the output (134) of the voice processing channel (132) can be provided to the audio input port of the primary mobile unit (11), while in the portable unit (10) this output (134) could be connected to an appropriate audio transducer. The output (136) of the data processing channel (133) can be connected to an appropriate decoding unit, such as a microprocessor, to allow proper decoding of the incoming signal for purposes described below.

Figure 13A:
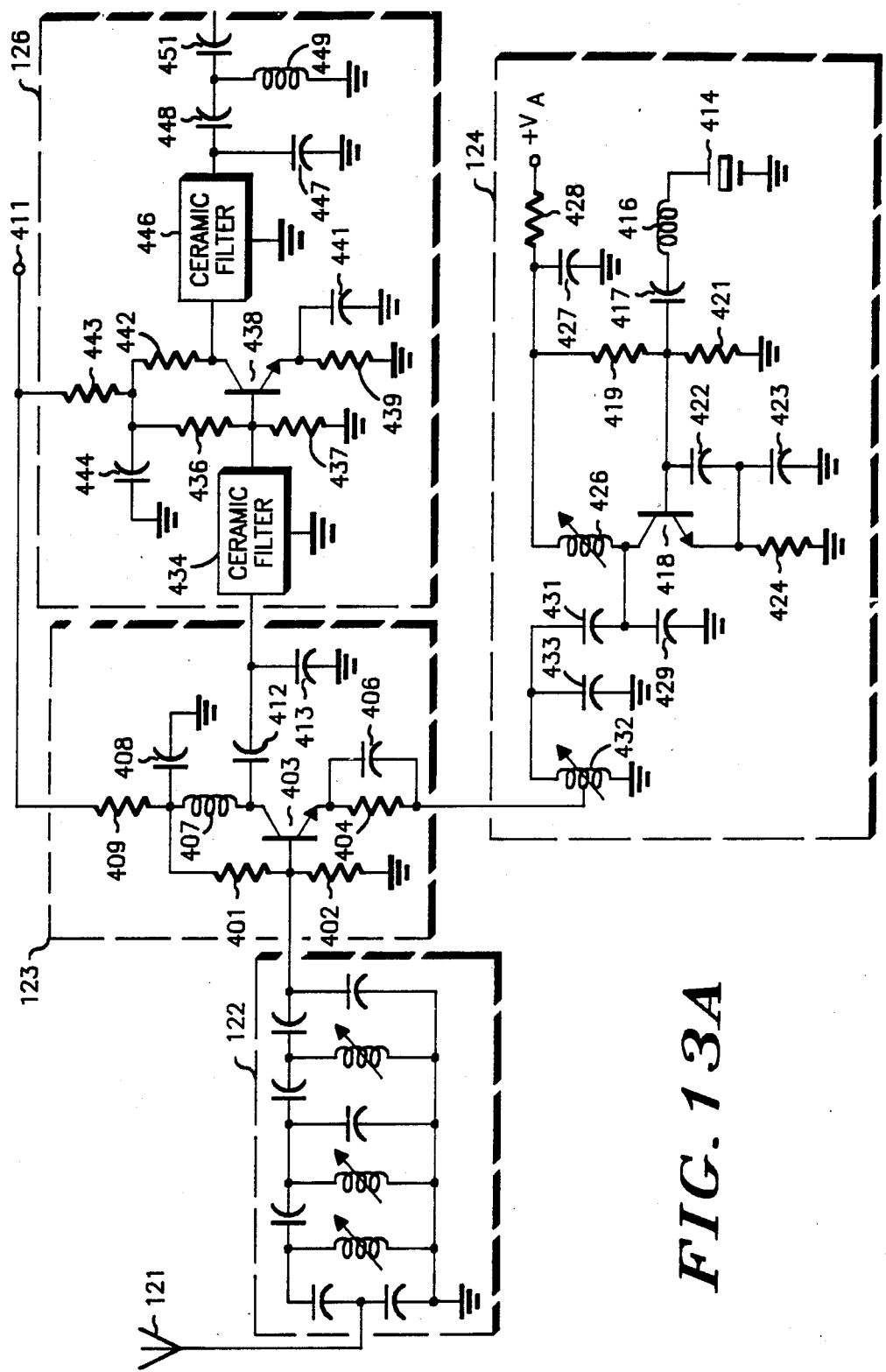
FIGS. 13A and B comprise a schematic diagram of the receiver.

Referring now to FIGS. 13A and B, a more detailed description of the receiver (120) will be provided.

The receiver (120) has an antenna (121) that connects to a preselector circuit (122) that can be comprised of various capacitors and inductors as well understood in the art. The preselector (122) functions in accordance with well understood prior art technique to pass only a range of frequencies, which range will contain the carrier frequency of interest.

The output of the preselector (122) connects to a first mixer (123). This mixer includes a voltage divider comprised of first and second resistors (401 and 402) that connects to the base of a 9662 transistor (403). The emitter of this transistor (403) connects through a parallel connected resistor (404) and 36 picofarad capacitor (406) to the first local oscillator (124) as described below. The collector of this transistor (403) connects through a 12 microhenry inductor (407) to a grounded 0.001 microfarad capacitor (408) and through a 51 ohm resistor (409) to a battery source (411). The collector of the transistor (403) also connects through a coupling capacitor (20 picofarad) (412) and past a grounded 22 picofarad filtering capacitor (413) to an IF stage (126).

The first local oscillator (124) referred to above includes a crystal (414) that connects between ground and through a series connected inductor (416) and 27 picofarad capacitor (417) to the base of a 9932 transistor (418). The base of this transistor (418) also connects to a voltage divider comprised of an 82 k ohm resistor (419) and a 20 k ohm resistor (421), and to a series connected 150 picofarad capacitor (422) and 91 picofarad capacitor (423). A common node between these two capacitors (422 and 423) connects to the emitter of the transistor (418) and also to an 820 ohm grounded resistor (424). The collector of this transistor (418) connects through a variable inductor (426) to a grounded 0.005 microfarad capacitor (427) and to a biased resistor (428). In addition, the collector of this transistor (418) connects to a grounded 57 picofarad capacitor (429) and also through a 1 picofarad capacitor (431) to a grounded variable inductor (432). The latter inductor (432) connects to a grounded 47 picofarad capacitor (433) and to the first mixer (123) described above.

The IF stage (126) includes a 10.7 MHz ceramic filter (434), the input of which connects to receive the output of the first mixer (123) and the output of which connects to a voltage divider comprised of a 2 k ohm resistor (436) and a 390 ohm resistor (437). The voltage divider connects to the base of an M9662 transistor (438), the emitter of which connects to a grounded parallel configured 360 ohm resistor (439) and 0.01 microfarad capacitor (441). The collector of this transistor (438) connects through a 330 ohm resistor (442) to a biased 51 ohm resistor (443) and to a grounded 0.001 microfarad capacitor (444).

Figure 13B:
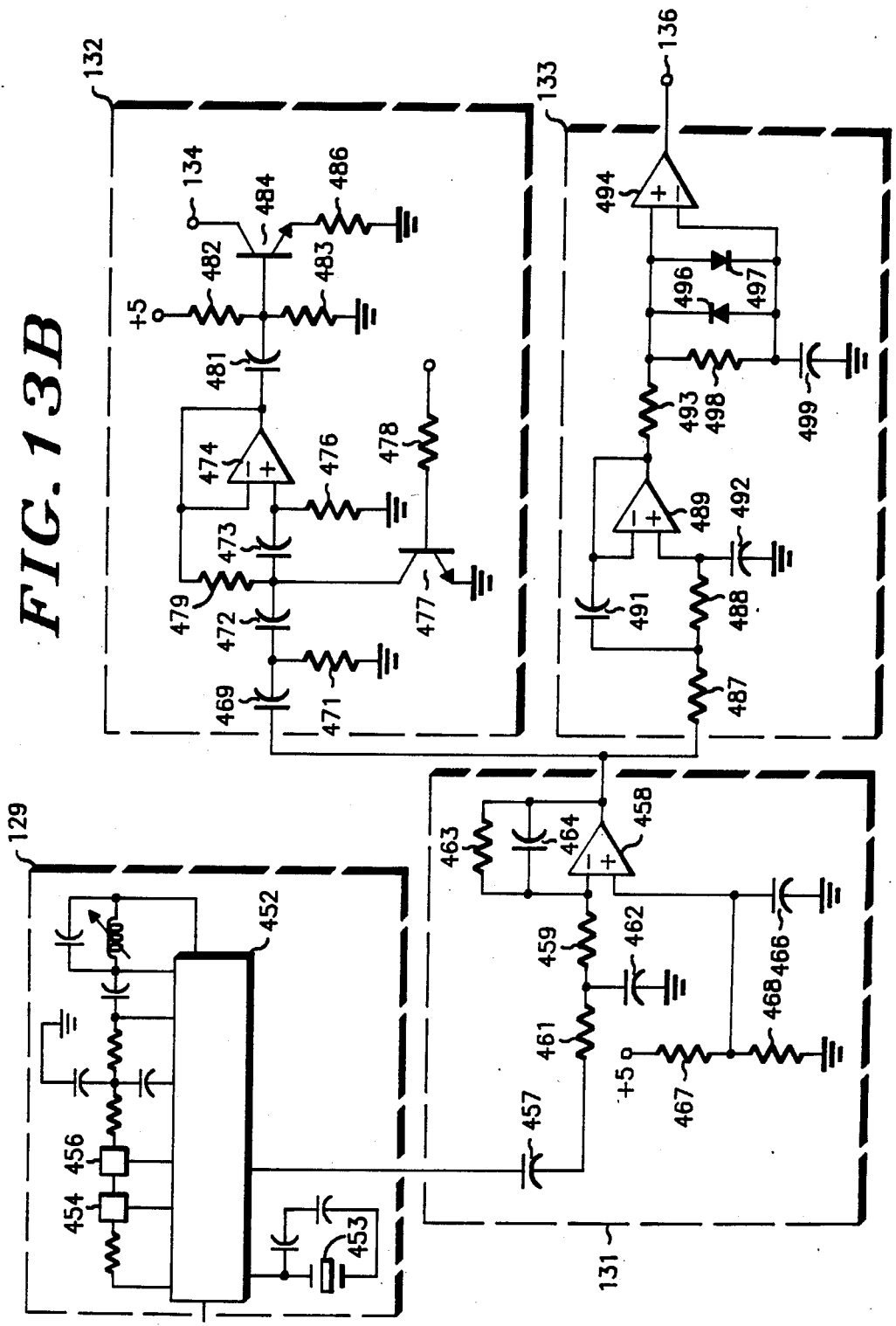

The collector of this transistor (438) connects to the input of a second 10.7 MHz ceramic filter (446), the output of which connects to a filter comprised of a grounded 22 picofarad capacitor (447), a 20 picofarad coupling capacitor (448), and a grounded 12 microhenry inductor (449). This filter then connects through a 0.001 microfarad coupling capacitor (451) to the input port of an MC3357 low power narrow band FM IF integrated circuit as manufactured by Motorola, Inc. (see FIG. 13B). This integrated circuit provides oscillator, mixer, limiting amplifier, quadrature discriminator, active filter, squelch, scan control, and mute switch functions. This integrated circuit (452) provides the second mixer (127), second local oscillator (128), and discriminator (129) functions. The MC3357 (452) can be configured as depicted with a 10.245 MHz crystal (453) and 455 kHz ceramic filters (454 and 456) to provide the above noted functions and to provide at its output a signal that includes the audio and subaudible data signalling as received from the portable unit transmitter (100).

This output signal connects through a 1 microfarad capacitor (457) to the amplifier stage (131). This amplifier includes an LM324 (458), the inverting input of which connects through a series connected 20 k ohm resistor (459) and 5 k ohm resistor (461) to receive the incoming signal, and with a common node between these two resistors (461 and 459) being connected to a grounded 0.022 microfarad capacitor (462). The inverting input of the LM324 (458) also connects through a parallel configured 330 k ohm resistor (463) and 0.0039 microfarad capacitor (464) to the output thereof. The noninverting input of the LM324 (458) connects to a grounded 10 microfarad capacitor (466) and to a voltage divider comprised of a 36 k ohm resistor (467) and a 18 k ohm resistor (468) that is biased between ground and a positive 5 volt source. So configured, this section provides both amplification and deemphasis.

The output of this amplifier stage (131) branches into both a voice processing path (132) and a data processing path (133). The voice processing path (132) essentially comprises a high pass filter followed by a buffer circuit. More particularly, the input to the voice processing path (132) connects through a 0.022 microfarad capacitor (469), a grounded 18 k ohm resistor (471), a 0.022 microfarad capacitor (472), and a 0.022 microfarad capacitor (473) to connect to the noninverting input of an LM324 (474). The noninverting input of the LM324 (474) also connects to a grounded 120 k ohm resistor (476) and responds operably to the collector of a 9642 transistor (477), the emitter of which connects to ground and the base of which connects to a 5 k ohm resistor (478) to receive a squelch signal from the secondary mobile unit microprocessor (701).

The collector of this transistor (477) also connects through a 6.8 k ohm resistor (479) to the output of the LM324 (474), which also directly feeds back to the inverting input thereof. The output of the LM324 (474) connects through a 10 microfarad capacitor (481) to a voltage divider comprised of a 4.7 k ohm resistor (482) and a 13 k ohm resistor (483) that is biased between a positive 5 volt source and ground. The voltage divider in turn connects to the base of a 9642 transistor (484), the emitter of which connects to a grounded 1.5 k ohm resistor (486) and the collector of which connects to the microphone high input line of the primary mobile unit (51) in the vehicle.

The data processing path (133) receives its input through a 360 k ohm resistor (487), which in turn connects through a 120 k ohm resistor (488) to the noninverting input of an LM324 (489) and through a 0.012 microfarad capacitor (491) to the inverting input thereof. The noninverting input also connects to a grounded 0.0018 microfarad capacitor (492), and the inverting input connects to the output thereof. In addition, the output connects through a 30 k ohm resistor (493) to the noninverting input of a second LM324 (494), with the noninverting input also connecting through parallel connected back-to-back diodes (496 and 497) to the inverting input thereof, and to a series connected 100 k ohm resistor (498) and 0.68 microfarad capacitor (499). The output of the second LM324 (494) comprises the data output port (136) that may be appropriately connected to a relevant microprocessor (either in the secondary mobile unit (51) or the portable unit (10)) to allow decoding of the data signals. So configured, the second LM324 (494) in the data processing channel (133) serves as a limiter, and the first LM324 (489) serves as a low pass filter.

Figure 14:
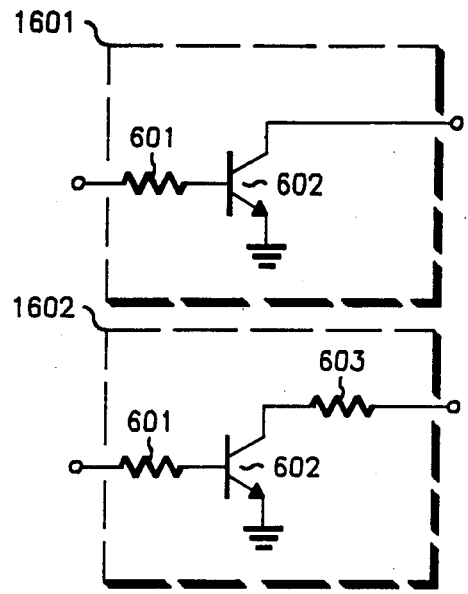
FIG. 14 comprises a schematic diagram of interface switches for use in the secondary mobile unit.

Referring now to FIG. 14, the secondary mobile unit microprocessor (801) can have one output connected to a switch (1601) comprised of a 10 k ohm resistor (601) and a 9642 transistor (602). This transistor (602) can have a grounded emitter and a collector that connects to the emergency activation switch as found, for instance, in a Systems 90 module (52). So configured, the secondary mobile unit microprocessor (801) can trigger the emergency transmission function of the Systems 90 module (52). Another switch (1602) comprised of a similar resistor and transistor can be provided (in addition to a 1 k ohm collector resistor (603)) to allow the microprocessor (801) to control the primary mobile unit's push-to-talk function, and thereby allow a push-to-talk ID to be transmitted by the primary mobile unit (11) and for audio as received by the secondary mobile unit (51) to be transmitted by the primary mobile unit (11) to the base station (13).

Figure 15:
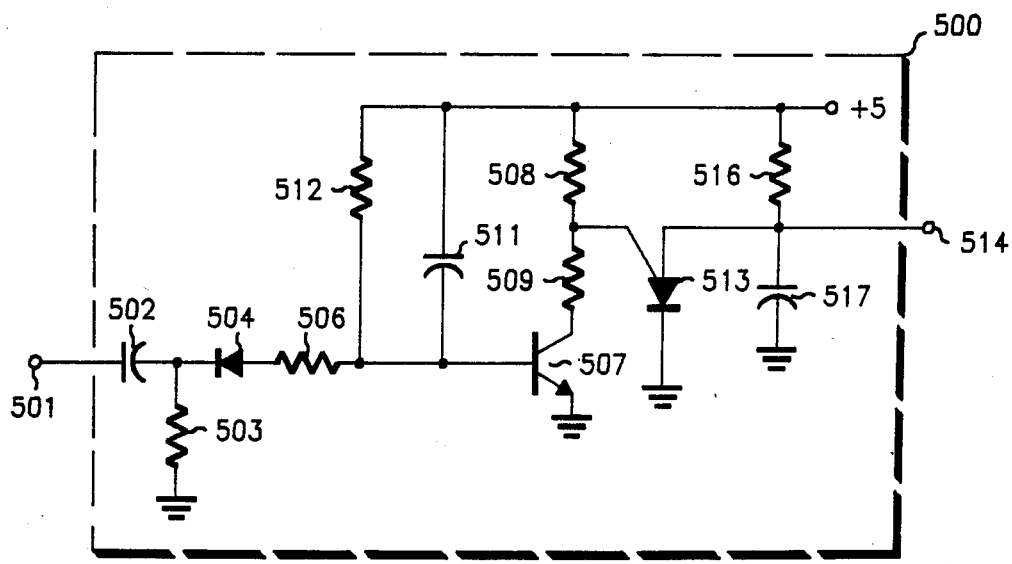
FIG. 15 comprises a schematic diagram of a watch dog circuit.

Referring now to FIG. 15, a watch dog timer circuit for use by the secondary mobile unit (51) can be seen as depicted generally by the numeral 500. The watch dog timer (500) receives a tickle signal from the secondary mobile unit microprocessor (801) at an appropriate input (501). This input connects through a 0.1 microfarad capacitor (502) to a grounded 6 k ohm resistor (503) and a series connected diode (504) and 1 k ohm resistor (506). This resistor (506) in turn connects to the base of a 9642 transistor (507) having a grounded emitter. The collector of this transistor (507) connects to a voltage divider comprised of two 10 k ohm resistors (508 and 509) that are biased by a 5 volt source. This 5 volt source also biases a parallel connected 1 microfarad capacitor (511) and 51 k ohm resistor (512) that connect to the base of the transistor (507). The voltage divider connects to the gate of a 9577 PUT (513). The cathode of the PUT (513) connects to ground and the anode connects to provide a reset output signal to the secondary mobile unit microprocessor (801). In addition, this output (514) connects to a biased 51 k ohm resistor (516) and a grounded 10 microfarad capacitor (517).

It will be recalled that the portable unit (10) operates with battery power. For ease of maintenance and to increase reliability, this battery can be made rechargeable. In particular, a Panasonic P11AA three cell nicad battery pack (which provides a nominal 3.6 volts) can be used.

Referring now to FIG. 16, a battery charging circuit as provided within the portable unit (10) can be seen as generally depicted by the numeral 300. The portable unit (10) side of the battery charging unit (300) includes generally a battery (301), a data interface unit (302), an input unit (303), and a transmitter enable unit (304).

The data interface unit (302) includes two input ports (306 and 307) that allow the battery charging unit (300) to be electrically connected to a complementary battery charging system in the secondary mobile unit (51) as described in more detail below. One of these terminals (306) connects to receive a positive voltage and the remaining terminal (307) connects to ground.

The data interface unit (302) further includes a Zener diode (308), 10 k ohm resistor (309), and 20 k ohm resistor (311) that connect in series between the positive terminal (306) and ground. In addition, the positive terminal (306) connects through a series connected 860 ohm resistor (312) and diode (313) to the positive terminal of the battery (301). The common node between the 10 k ohm resistor (309) and the 20 k ohm resistor (311) connects to the base of a 9642 transistor (314), the emitter of which connects to ground and the collector of which comprises a reset port that can be connected to the reset input of the portable unit microprocessor (801). The collector of this transistor (314) also connects to a grounded 10 microfarad capacitor (316) and through a 10 k ohm resistor (317) to the cathode side of the previously noted diode (313).

The anode side of this diode (313) connects to a voltage divider comprised of a 20 k ohm resistor (318) and a 10 k ohm resistor (319). This voltage divider connects to the base of a second 9642 transistor (321). The emitter of this transistor connects to ground and the collector connects to a 10 k ohm biasing resistor (322) and further serves as the data input terminal for the portable unit microprocessor (801).

So configured, the data interface unit (302) serves to provide a reset signal to the portable unit microprocessor (801) as appropriately commanded by the secondary mobile unit (51)(as described below in more detail) and further serves to detect and provide digitized data to the portable unit microprocessor (801) as modulated with the charging signal.

The input unit (303) includes a PTT switch (323) and an emergency switch (324) to allow an operator to awaken and properly control the portable unit microprocessor (801). The PTT switch (323) connects between ground and a parallel connected 0.02 microfarad capacitor (326) and 100 k ohm resistor (327), which in turn connect in series with a 20 k ohm resistor (328) that connects to the positive side of the battery (301). The emergency switch (324) is similarly configured with like numerals referring to similarly valued and configured components.

So configured, closing either switch (323 or 324) will provide a strobe signal at an interrupt strobe output (329) that is used to activate the portable unit microprocessor (801) in accordance with well understood prior art technique. In addition, the microprocessor (801) can examine both a PTT sense input (331) and the emergency sense input (332) to ascertain which switch (323 or 324) has been closed and thereby ascertain what action is required.

The transmitter enable unit (304) includes a 9643 transistor (333) that has an emitter connected to the positive terminal of the battery (301) and a collector connected to provide the switched voltage source to the transmitter (100) described above. The base of this transistor (333) connects through a 5.1 k ohm resistor (334) to the collector of a 9642 transistor (336), the emitter of which connects to ground and the base of which connects through a 20 k ohm resistor (337) to an appropriate output enable port of the portable unit microprocessor (801).

So configured, the portable unit microprocessor (801) can enable the transmitter (100) by allowing the battery (301) to provide power to the transmitter (100) components.

With continued reference to FIG. 16, the secondary mobile unit battery charging circuit can be seen as generally depicted by the numeral 350. This battery charging circuit (350) includes a connection to the vehicle battery (351) that connects through a 920 ohm resistor (352) to a portable unit sense unit (353), a reset command unit (354), and a data modulation unit (356).

The portable unit sense unit (353) includes a series connected 6.8 volt Zener diode (357), a 10 k ohm resistor (358), and a 4.7 volt Zener diode (359). The output (361) of the portable unit sense unit (353) provides a signal to the secondary mobile unit microprocessor (701) indicating when the portable unit (10) has been connected to the battery charging terminals (362 and 363) of the secondary mobile unit charging HUB (28) described above.

The reset command unit (354) includes an input (364) for receiving an appropriate reset signal from the secondary mobile unit microprocessor (701) that connects through a 10 k ohm resistor (366) to the base of a 9642 transistor (367). The emitter of this transistor (367) connects to ground and the collector connects through a 10 k ohm resistor (368) to the base of a 9643 transistor (369) and also through a second 10 k ohm resistor (371) to the vehicle's battery, which also connects to the emitter of the 9643 transistor (369). The collector of the latter transistor (369) connects to the positive battery charger terminal (362) and functions to provide a relatively large signal to the portable unit battery charger unit (300) that causes the data interface unit (302) to provide a reset signal at the output port identified therein.

The data modulation unit (356) includes an input port (372) for receiving data signals from the secondary mobile unit microprocessor (701). This input (372) connects through a 10 k ohm resistor (373) to connect to the base of a 9642 transistor (374), the emitter of which connects to ground and the collector of which connects to the positive battery charger terminal (362). So configured, data signals as provided by the microprocessor (701) are modulated with the charging signal. These data signals can be interpreted by the data interface unit (302) of the portable unit battery charger unit (300) for subsequent use by the portable unit microprocessor (801) as described below.

By turning the data transmission transistor (374) in the secondary mobile unit battery charger (350) on and off, the corresponding data sense transistor (321) in the portable unit battery charger circuit (300) will similarly be switched on and off. In this way, digitized data can be transferred over the battery charger circuit to the portable unit microprocessor (801), where the information can be decoded and appropriately buffered and acted upon. The diode (313) in the portable unit battery charger, of course, functions to protect the battery (301) from discharging when this data transfer occurs.

As a direct result of the above configuration, the two battery charger connections between the portable unit (10) and the secondary mobile unit support trickle charge for the portable unit battery (301), resetting of the portable unit microprocessor (801) on command, and the transfer of data between the secondary mobile unit microprocessor (701) and the portable unit microprocessor (801).

To ensure that the secondary mobile unit (51) responds only to the portable unit (10) that is specifically assigned to it, the portable unit (10) and secondary mobile unit (51) use a data transmission comprising a plurality of codes, including an ID code, a PTT code, and an emergency code. These codes, which may be subaudibly transmitted, are newly generated each time the portable unit (10) and secondary mobile unit (51) are physically joined together via the battery charger as described above. To ensure accurate creation, transmission, reception, and usage of these codes, a number of safeguards have been utilized.

Figure 17A:
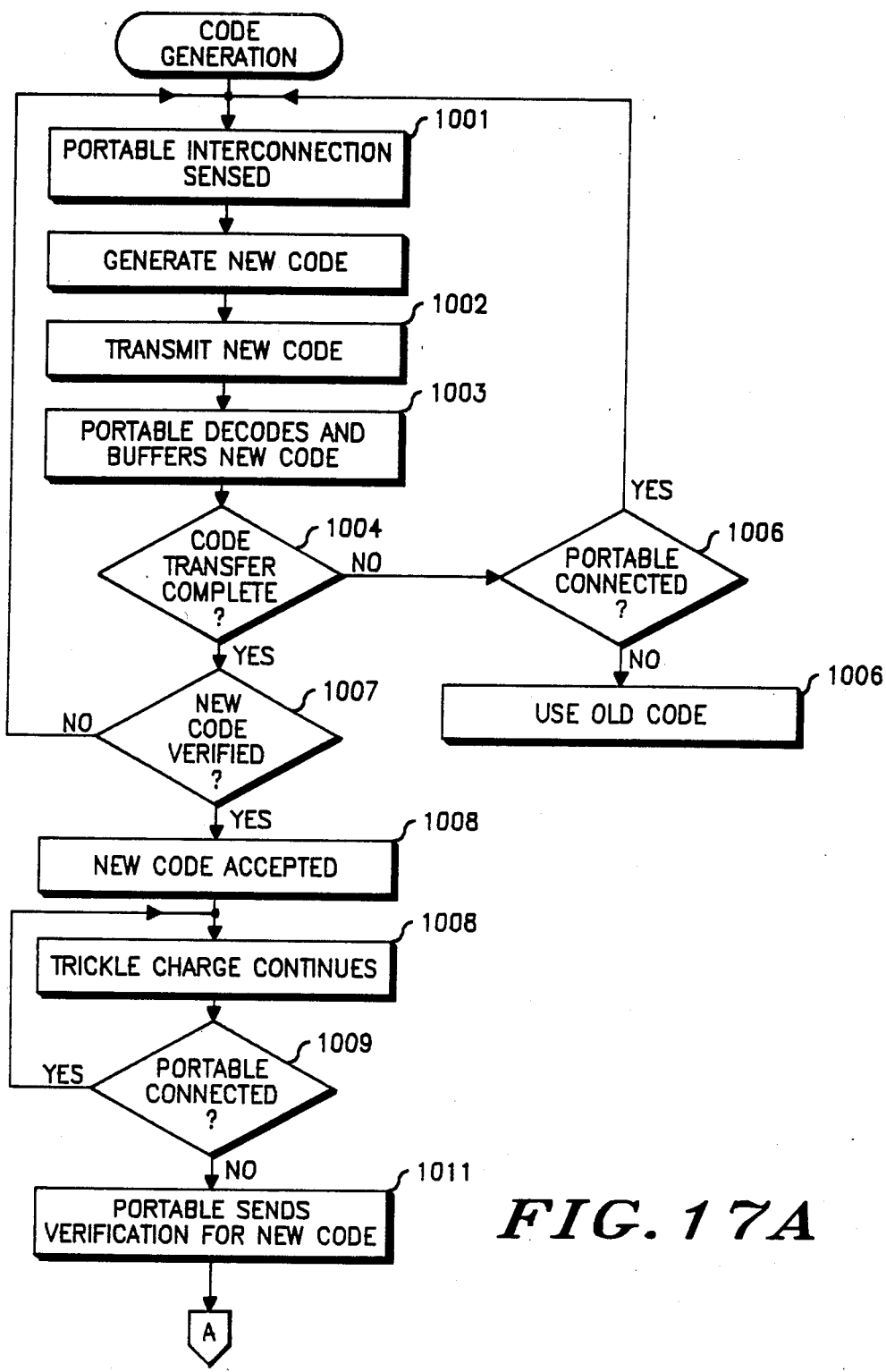
FIGS. 17A and B comprise a flow chart of the new code generation and transfer process.

With reference to FIG. 17, the code generation process begins with the secondary mobile unit (51) recognizing that the portable unit (10) has been placed into the battery charging HUB (28)(1001). The mobile unit (51) then generates new codes and transmits them (1002) via modulation of the charging signal to the portable (10). The portable (10) decodes the signals and buffers the new codes (1003). If the portable (10) is removed from the charging HUB (28) prior to the time the code transfer process concludes (1004), both units (10 and 51) will default back to the original codes. Otherwise, the portable (10) will verify reception of the new codes by making an appropriate transmission (1007) and continuous trickle charging of the portable unit battery (301) will follow (1008).

As soon as the portable (10) is removed from the battery charging HUB (28)(1009), the portable (10) will send a signal (51) to the mobile to verify the new codes (1011). If the mobile (51) does not receive the correct new codes within a predetermined period of time (1012), the mobile (51) will sound an audible alert (1013) to let the operator know that the portable (10) has not been charged with correct new codes. (The operator would then reinsert the portable (10) to allow the process to repeat.) If, however, the new codes are received and confirmed by the mobile (51)(1014), the mobile (51) sounds an audible signal to confirm receipt of the correct codes, and the mobile (51) and portable (10) then function with the new codes (1016).

By generating new codes with each connection, only a small likelihood exists that two different portable units (10) having identical codes will be used in proximity to one another. And, in the event that such an occurance happened, the codes could be simply changed by repeating the above procedure. By use of this system, inventory and service problems are also minimized, since any portable unit (10) in the fleet can be used with any secondary mobile unit (51) in the fleet by following the above process.

If desired, only the ID need be renewed with each connection. To ensure yet greater security, however, the PTT code and the emergency code referred to above can also be generated anew each time the secondary mobile unit (51) also generates a new ID code for the portable unit (10). In this way, each mobile-portable pair will not only have a new, randomly generated ID code each time they are paired, but also new and presumably unique PTT and emergency codes. This assures greater security and a smaller likelihood that one mobile-portable pair will interfere in the operation of other mobile-portable pairs.

During use of the above described system, and with reference to FIG. 18, the portable unit microprocessor (701) will ordinarily be off (1101). If the operator pushes the emergency button (24), the microprocessor (701) activates and determines that the emergency button (24) was the button that was closed (1102). If the button (24) has been pushed a predetermined number of time (such as twice or three times) within five consecutive seconds (1103), the portable unit (10) sends a subaudible emergency code to the secondary mobile unit (51) for a predetermined period of time (1104), such as ten seconds. This signal can be used as described above by a properly programmed mobile unit, such as a Motorola MDC 600 equipped unit, to toggle and function in an emergency broadcast format. This means that the primary mobile unit (11) will send a predetermined emergency code to the base station (13) to alert the base station (13) to an emergency involving the operator. This signal includes ID information and the like to allow the base station operator to ascertain who the emergency involves. (To aid in preventing false triggering of the emergency function, the secondary mobile unit (51) could be programmed to require receipt of three consecutive emergency signal detections from the portable unit (10), which three detections would ordinarily require about one and a half seconds before acting as set forth above.)

If the operator pushes the PTT button (23), the microprocessor (701) causes a subaudible PTT code to be transmitted to the secondary mobile unit (51) for at least a predetermined period of time (such as two seconds)(1106), and also for so long as the PTT button (23) remains pushed (1107). As described above, this PTT code is used by the secondary mobile unit (51) to enable providing voice transmissions from the portable unit (10) to the primary mobile unit (11) for transmission to the base station (13).

When both the portable unit (10) and the secondary mobile unit (51) are configured as transceivers, additional operating concerns become applicable. For instance, due to the limited range of the portable unit (10), the likelihood exists that the portable unit (10) will be carried out of reception range of the secondary mobile unit (51) from time to time. One embodiment of the invention lets the operator know when the portable unit (10) has moved out of range of the secondary mobile unit (51), and also when the secondary mobile unit (51) has transmitted a message that the portable unit (10) has not received.

Figure 19:
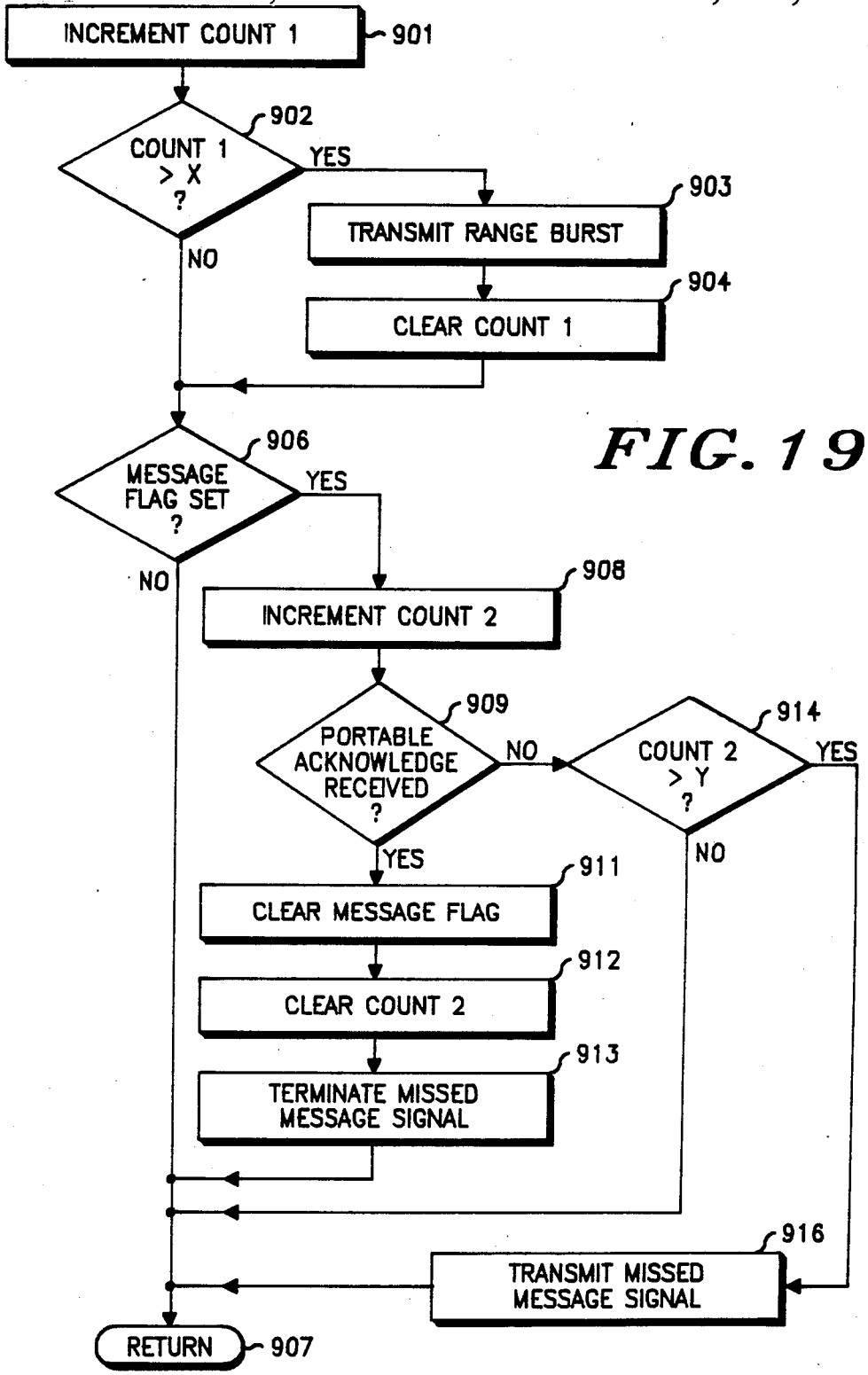
FIG. 19 comprises a flow chart of secondary mobile unit operation under certain operating circumstances.

With reference to FIG. 19, the secondary mobile unit microprocessor (701) can be programmed to operate to provide both a range burst and a missed message signal when appropriate. For example, the secondary mobile unit microprocessor (701) can increment a count 1 (901) and then determine whether this count 1 exceeds a predetermined threshold (X)(902). If not, the microprocessor (701) can proceed to the next inquiry. If count 1 does exceed this variable, however, the secondary mobile unit (51) can transmit a range burst signal (903) and then clear count 1 (904). In this way, the secondary mobile unit (51) will, from time to time, transmit a range burst signal to the portable unit (10) which the portable unit (10) can use to confirm within-range status. Typically, the range burst signal can be comprised of a subaudible digitized code that can be created by the secondary mobile unit (51) and imparted to the portable unit (10) at the same time that the IDs, PTT and emergency codes are created and imparted as described above.

Following the range burst process, the microprocessor (701) determines whether a message flag has been set (906). This flag may be set by the microprocessor (701), whenever the microprocessor (701) functions to transmit audio from the primary mobile unit (11) via its own transmitter (100). If the message flag has not been set, meaning no message has been sent, the microprocessor (701) can return to other functions (907). If the message flag has been set, however, the microprocessor (701) can increment a count 2 (908) and then determine whether the portable unit (10) has acknowledged reception of the message (909). This presumes, of course, that the portable unit (10) has been programmed to transmit an acknowledgement code to the secondary mobile unit (51) following receipt of a transmission. If the portable has acknowledged receipt of the message, the microprocessor (701) will clear the message flag (911), clear count 2 (912), and terminate transmission of any missed message signals that may have been previously authorized (913). If, however, the portable unit (10) has not acknowledged receipt of a message (909), the microprocessor (701) will determine if count 2 exceeds a predetermined threshold (Y)(914). If not, the microprocessor (701) will return (907) to other preassigned duties. If count 2 does exceed the predetermined threshold (914), however, the microprocessor (701) will transmit a missed message signal (916) and then return (907).

Figure 20:
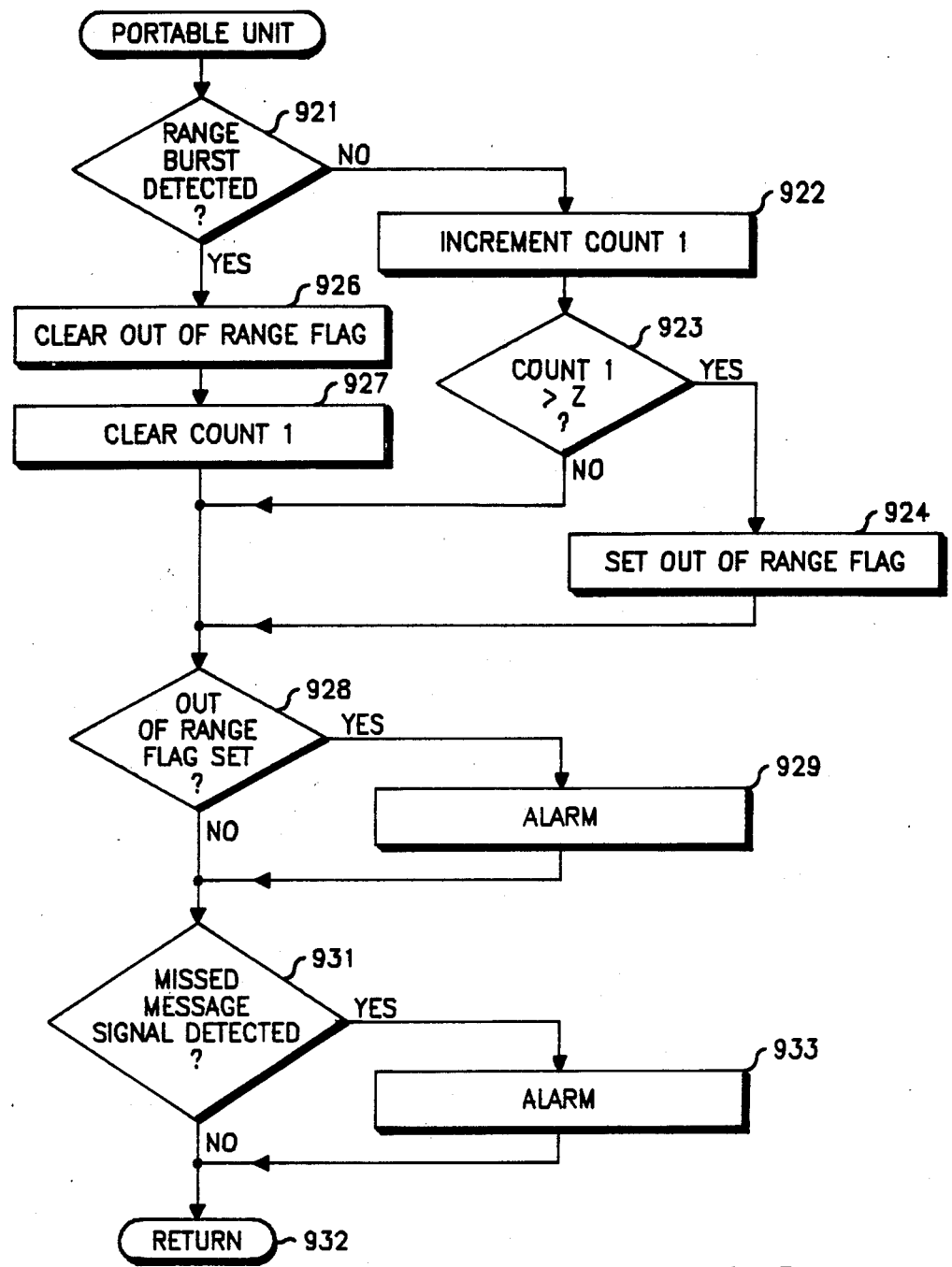
FIG. 20 comprises a flow chart of portable unit operation under certain operating circumstances.

So programmed, the secondary mobile unit microprocessor (701) will support both range burst and missed message signal functions. In order to complement these secondary mobile unit (51) functions, the portable unit microprocessor (801) requires additional programming as well. With reference to FIG. 20, the portable unit microprocessor (801) can begin by determining whether a range burst transmission from the secondary mobile unit (51) has been detected (921). If not, a count 1 can be incremented (922) and a determination made as to whether this count 1 exceeds a predetermined threshold (Z) (923). If count 1 does not exceed this threshold, the microprocessor (801) can move to an out-of-range flag set determination as explained below. If count 1 does exceed this threshold (923), however, an out-of-range flag can be set (924) and the subroutine can continue. If a range burst has been detected (921), the out-of-range flag can be cleared (926), as can count 1 (927).

Following the above determinations and actions, the microprocesor (801) next determines whether the out-of-range flag has been set (928). If it has been set, the microprocessor (801) provides an appropriate alarm (929) through appropriate sounding of an alarm unit (799) (FIG. 8) provided for that purpose.

Following the above actions, the microprocessor (801) can determine whether any missed message signals have been received from the secondary mobile unit (51) (931). If not, the microprocessor (801) can return (932). If a missed message signal has been detected (931), however, an appropriate alarm (933) can again be provided to the operator. The operator can then take whatever actions are appropriate.

Those skilled in the art will recognize that various modifications and changes could be made to the above described embodiments without departing from the spirit and scope of the invention For example, instead of generating both a new PTT code and a new emergency code, the secondary mobile unit (51) could generate and transmit to the portable unit (10) a single code to meet the need for a PTT code, and the portable unit (10) could invert this code for use as the emergency code. The secondary mobile unit (51), of course, would be configured to recognize the inverted PTT code as the emergency code, such that it could respond appropriately. Therefore, it should be understood that the claims should not be considered as limited to the above described embodiments, in the absence of express inclusion of such embodiments in the claims.

I claim:

1. A battery charging, reset, and data transfer system for use with:
    a first unit having data means for generating digital data signals and charging, reset, means for providing a battery charge signal; and
    a second unit having processor means for receiving digital data signals and a battery; the battery charging, reset, and data transfer system comprising:
    in said first unit:
        reset means for generating reset signals;
        data transfer means for receiving said digital data signals and said reset signals and for modulating said battery charge signal with said digital data signals and said reset signals;
        first conductor means for providing said battery charge signal to said second unit;
    in said second unit:
        second conductor means for receiving said battery charge signal from said first unit;
        data interface means for demodulating said battery charge signal and for providing recovered digital data signals and reset signals to said processor means;
        battery charging, reset, means for providing said battery charge signal to said battery.

2. The battery charging, reset, and data transfer system of claim 1 wherein said reset signals are relatively larger than said digital data signals.

3. The battery charging, reset, and data transfer system of claim 1 wherein said first unit further includes sense means for sensing when said second conductor means of said second unit are operably connected to said first conductor means of said first unit.

4. The battery charging, reset, and data transfer system of claim 3 wherein said means for generating digital data signals in said first unit comprises second processor means, and wherein said second processor means are responsive to said sense means to control generation of said digital data signals.

5. The battery charging, reset, and data transfer system of claim 1 wherein said first unit further includes a housing having a cavity formed therein for receiving said second unit.

6. The battery charging, reset, and data transfer system of claim 5 wherein said first conductor means comprises a first and second conductor that protrude outwardly of said cavity.

7. The battery charging, reset, and data transfer system of claim 6 wherein said second unit includes a housing having holes formed therethrough for receiving said first and second conductors.

8. The battery charging, reset, and data transfer system of claim 1 wherein said processor means resets upon receiving said reset signal.

* * * * *

UNITED STATES PATENT AND TRADEMARK OFFICE
CERTIFICATE OF CORRECTION

PATENT NO. : 4,700,375
DATED : October 13, 1987
INVENTOR(S) : John D. Reed

It is certified that error appears in the above-identified patent and that said Letters Patent is hereby corrected as shown below:

In Column 18, line 17, after the word "signals" please insert --, wherein said reset signals are distinct from said digital data signals--.

Signed and Sealed this

Twelfth Day of April, 1988

Attest:

DONALD J. QUIGG

*Attesting Officer*     *Commissioner of Patents and Trademarks*